(12) United States Patent
Saimaru et al.

(10) Patent No.: US 9,748,554 B2
(45) Date of Patent: Aug. 29, 2017

(54) ELECTRIC STORAGE DEVICE AND METHOD FOR MANUFACTURING ELECTRIC STORAGE DEVICE

(71) Applicant: Hitachi Automotive Systems, Ltd., Hitachinaka-shi, Ibaraki (JP)

(72) Inventors: Sho Saimaru, Hitachinaka (JP); Kinya Aota, Hitachinaka (JP); Kouichi Kajiwara, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 119 days.

(21) Appl. No.: 14/782,702

(22) PCT Filed: Apr. 12, 2013

(86) PCT No.: PCT/JP2013/061065
§ 371 (c)(1),
(2) Date: Oct. 6, 2015

(87) PCT Pub. No.: WO2014/167712
PCT Pub. Date: Oct. 16, 2014

(65) Prior Publication Data
US 2016/0164066 A1    Jun. 9, 2016

(51) Int. Cl.
*H01M 2/36* (2006.01)
*H01G 11/58* (2013.01)
(Continued)

(52) U.S. Cl.
CPC ............ *H01M 2/365* (2013.01); *H01G 11/58* (2013.01); *H01G 11/78* (2013.01); *H01G 11/80* (2013.01); *H01G 11/84* (2013.01)

(58) Field of Classification Search
CPC .......................... H01M 2/0473; H01M 2/365
See application file for complete search history.

(56) References Cited

U.S. PATENT DOCUMENTS

2011/0183196 A1*  7/2011  Suzuki .................. H01M 2/043
                                                        429/185

FOREIGN PATENT DOCUMENTS

EP    1 037 292 A1    9/2000
EP    2 207 225 A1    7/2010
(Continued)

OTHER PUBLICATIONS

European Search Report issued in counterpart European Application No. 13881697.0 dated Nov. 21, 2016 (six pages).
(Continued)

*Primary Examiner* — Olatunji Godo
(74) *Attorney, Agent, or Firm* — Crowell & Moring LLP

(57) ABSTRACT

An electric storage device includes a container which houses an electric generating element, and a sealing plug which seals a liquid injecting hole into which an electrolyte is injected. The liquid injecting hole is provided in a bottom surface of a recessed portion provided to be recessed on one side surface of the container. The sealing plug includes an inserting portion to be inserted into the liquid injecting hole and a fitting portion to be fitted into the recessed portion. At least either a rim portion of the fitting portion or an opening rim portion of the recessed portion is provided with a plurality of plastic deformation portions. In each of n regions (n is an integer of at least 3) into which an outer circumference of the fitting portion or an inner circumference of the recessed portion is equally divided, one or more of the plastic deformation portion(s) is/are arranged, and, in each of regions into which the outer circumference of the fitting portion or the inner circumference of the recessed portion is halved with an arbitrary plastic deformation portion out of the plastic deformation portions set as a starting point, one or more of the plastic deformation portion(s) is/are arranged. An outer circumferential side surface of the fitting portion
(Continued)

and an inner circumferential side surface of the recessed portion are welded over an entire circumference.

4 Claims, 22 Drawing Sheets

(51) Int. Cl.
  *H01G 11/78* (2013.01)
  *H01G 11/80* (2013.01)
  *H01G 11/84* (2013.01)

(56) References Cited

FOREIGN PATENT DOCUMENTS

| JP | 2003-229118 A | 8/2003 |
| JP | 2008-10264 A | 1/2008 |
| JP | 2009-146719 A | 7/2009 |
| JP | 2009-199819 A | 9/2009 |

OTHER PUBLICATIONS

International Search Report (PCT/ISA/210) issued PCT Application No. PCT/JP2013/061065 dated Jun. 4, 2013 with English translation (three pages).

* cited by examiner

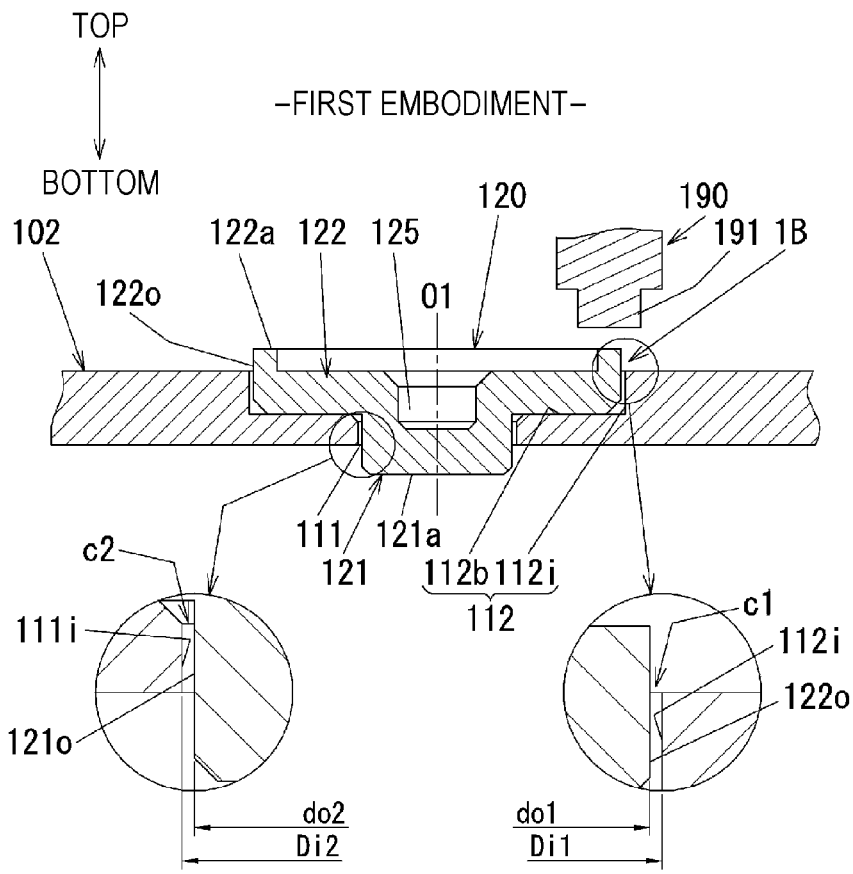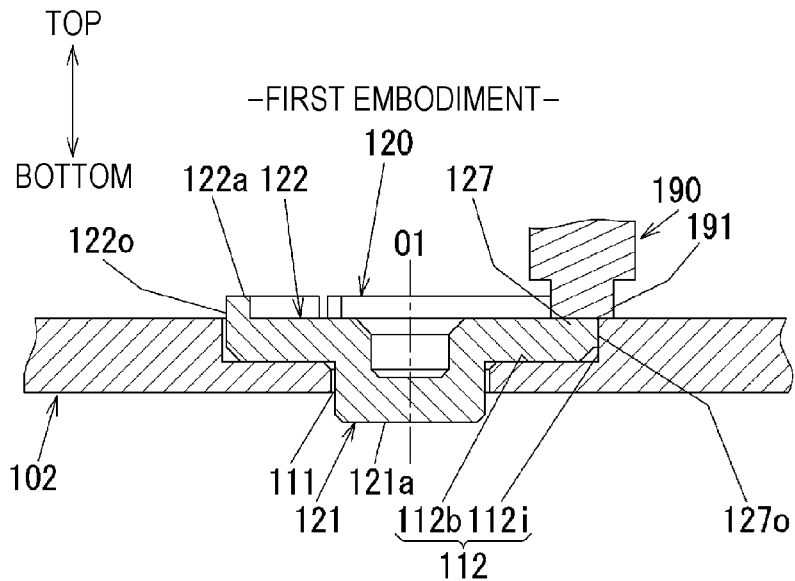

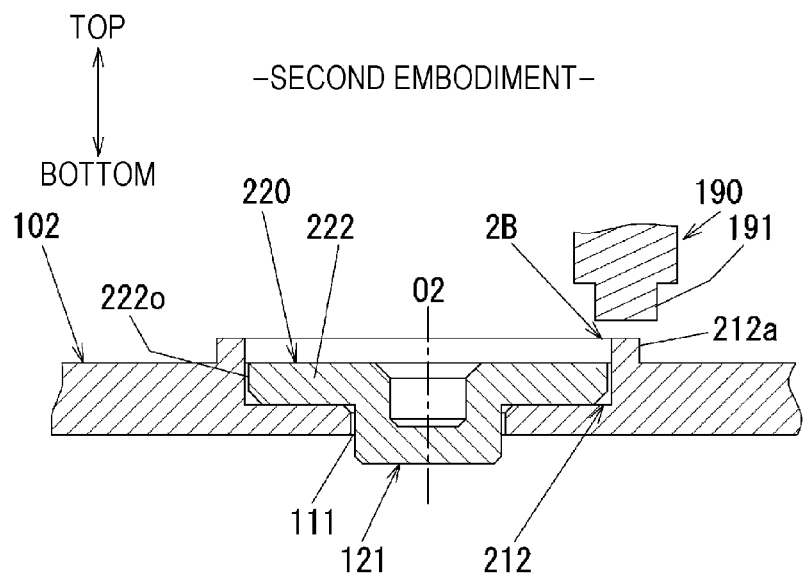
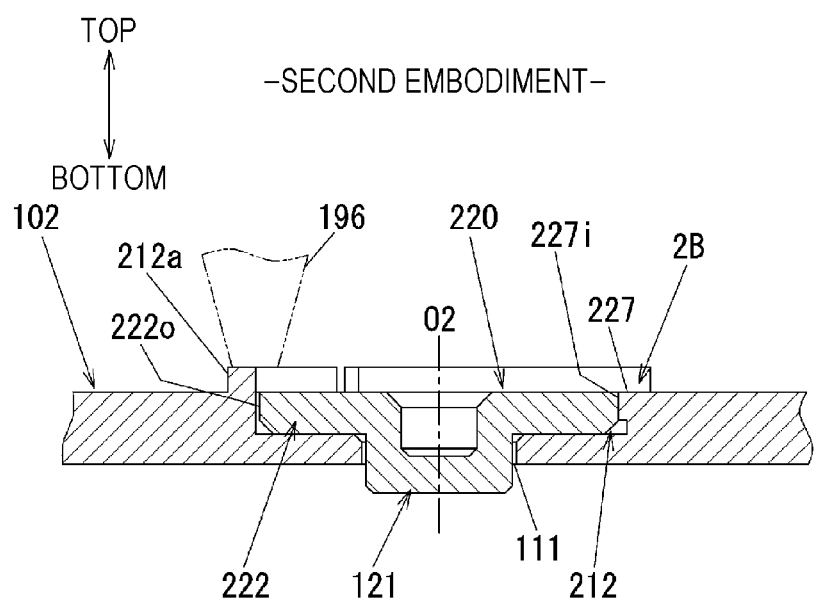

ELECTRIC STORAGE DEVICE AND METHOD FOR MANUFACTURING ELECTRIC STORAGE DEVICE

TECHNICAL FIELD

The present invention relates to an electric storage device and a method for manufacturing an electric storage device.

BACKGROUND ART

In a battery can of a secondary battery such as a lithium ion secondary battery, an electric generating element is housed, and an electrolyte is injected. The battery can is sealed by a battery lid. The electrolyte is injected into the battery can from an opening portion for liquid injection (hereinbelow referred to as a liquid injecting portion) provided in the battery lid, and after injection, the liquid injecting portion is sealed by a sealing plug. The sealing plug is inserted into the liquid injecting portion and is normally connected with the liquid injecting portion by means of laser beam welding or the like (PTL 1).

CITATION LIST

Patent Literature

PTL 1: JP 2009-199819 A

SUMMARY OF INVENTION

Technical Problem

In a case in which insertability of the sealing plug into the liquid injecting portion is taken into consideration, a gap is required between the liquid injecting portion and the sealing plug. In a method for welding the sealing plug to the liquid injecting portion by means of laser beam welding, electron beam welding, or the like, welding is performed along an outer circumference of the sealing plug with a predetermined position set as a welding start point. Thus, in the welding procedure in a circumferential direction, a metal melted at the welding start point is solidified and contracted, and the sealing plug is thus displaced, which may cause the gap between the sealing plug and the liquid injecting portion to be non-uniform. As a result, a part having a large gap lacks in the weld metal for sealing the gap, and a weld defect such as a crack may be generated in the weld metal.

Solution to Problem

According to a first aspect of the present invention, an electric storage device includes: a container which houses an electric generating element; and a sealing plug which seals a liquid injecting hole into which an electrolyte is injected, and the liquid injecting hole is provided in a bottom surface of a recessed portion provided to be recessed on one side surface of the container, the sealing plug includes an inserting portion to be inserted into the liquid injecting hole and a fitting portion to be fitted into the recessed portion, at least either a rim portion of the fitting portion or an opening rim portion of the recessed portion is provided with a plurality of plastic deformation portions, in each of n regions (n is an integer of at least 3) into which an outer circumference of the fitting portion or an inner circumference of the recessed portion is equally divided, one or more of the plastic deformation portion(s) is/are arranged, and, in each of regions into which the outer circumference of the fitting portion or the inner circumference of the recessed portion is halved with an arbitrary plastic deformation portion out of the plastic deformation portions set as a starting point, one or more of the plastic deformation portion(s) is/are arranged, and an outer circumferential side surface of the fitting portion and an inner circumferential side surface of the recessed portion are welded over an entire circumference.

According to a second aspect of the present invention, in a method for manufacturing an electric storage device for housing an electric generating element in a container, injecting an electrolyte into the container via a liquid injecting hole provided in a bottom surface of a recessed portion provided to be recessed on one side surface of the container, and sealing the liquid injecting hole by using a sealing plug, the method includes: when the liquid injecting hole is sealed by the sealing plug, arranging the sealing plug in the liquid injecting hole by inserting an inserting portion provided in the sealing plug into the liquid injecting hole and fitting a fitting portion provided in the sealing plug into the recessed portion; temporarily attaching the sealing plug to the liquid injecting hole by pressing a plurality of predetermined positions in at least either a rim portion of the fitting portion or an opening rim portion of the recessed portion from an outward side of the container to form plastic deformation portions; and welding an outer circumferential side surface of the fitting portion and an inner circumferential side surface of the recessed portion over an entire circumference, and, in each of n regions (n is an integer of at least 3) into which an outer circumference of the fitting portion or an inner circumference of the recessed portion is equally divided, one or more of the plastic deformation portion(s) is/are arranged, and, in each of regions into which the outer circumference of the fitting portion or the inner circumference of the recessed portion is halved with an arbitrary plastic deformation portion out of the plastic deformation portions set as a starting point, one or more of the plastic deformation portion(s) is/are arranged.

Advantageous Effects of Invention

According to the present invention, when a sealing plug is welded to a liquid injecting portion by mean of welding, displacement of the sealing plug is prevented, and reliability of sealing can be improved.

BRIEF DESCRIPTION OF DRAWINGS

FIGS. 6A and 6B are schematic cross-sectional views illustrating a state in which the sealing plug is arranged in the liquid injecting portion, and FIG. 6(b) is a schematic cross-sectional view illustrating a state in which the sealing plug is temporarily attached to the liquid injecting portion.

FIG. 7(b) is a schematic cross-sectional view illustrating a state in which the sealing plug has been welded to the liquid injecting portion.

FIG. 8(b) is a schematic plan view illustrating a state in which the sealing plug is temporarily attached to the liquid injecting portion.

FIGS. 14A and 14B are schematic cross-sectional views describing a sealing method for sealing a liquid injecting hole by using a sealing plug in an electric storage device according to a second embodiment.

DESCRIPTION OF EMBODIMENTS

Hereinbelow, embodiments of an electric storage device and a method for manufacturing an electric storage device according to the present invention will be described with reference to the drawings.

First Embodiment

Figure 1:
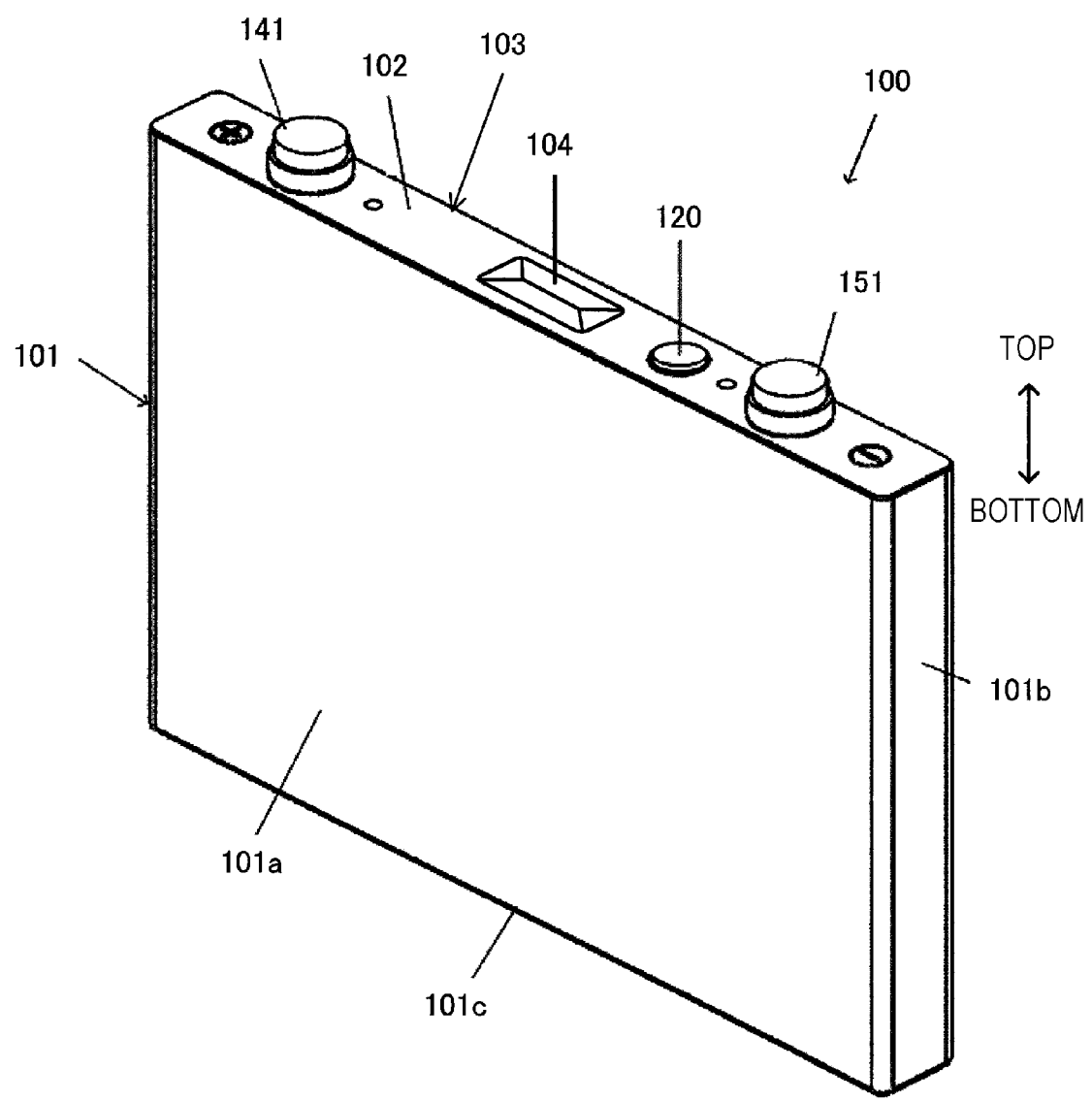
FIG. 1 is an external perspective view of a rectangular secondary battery as a first embodiment of an electric storage device according to the present invention.
Figure 2:
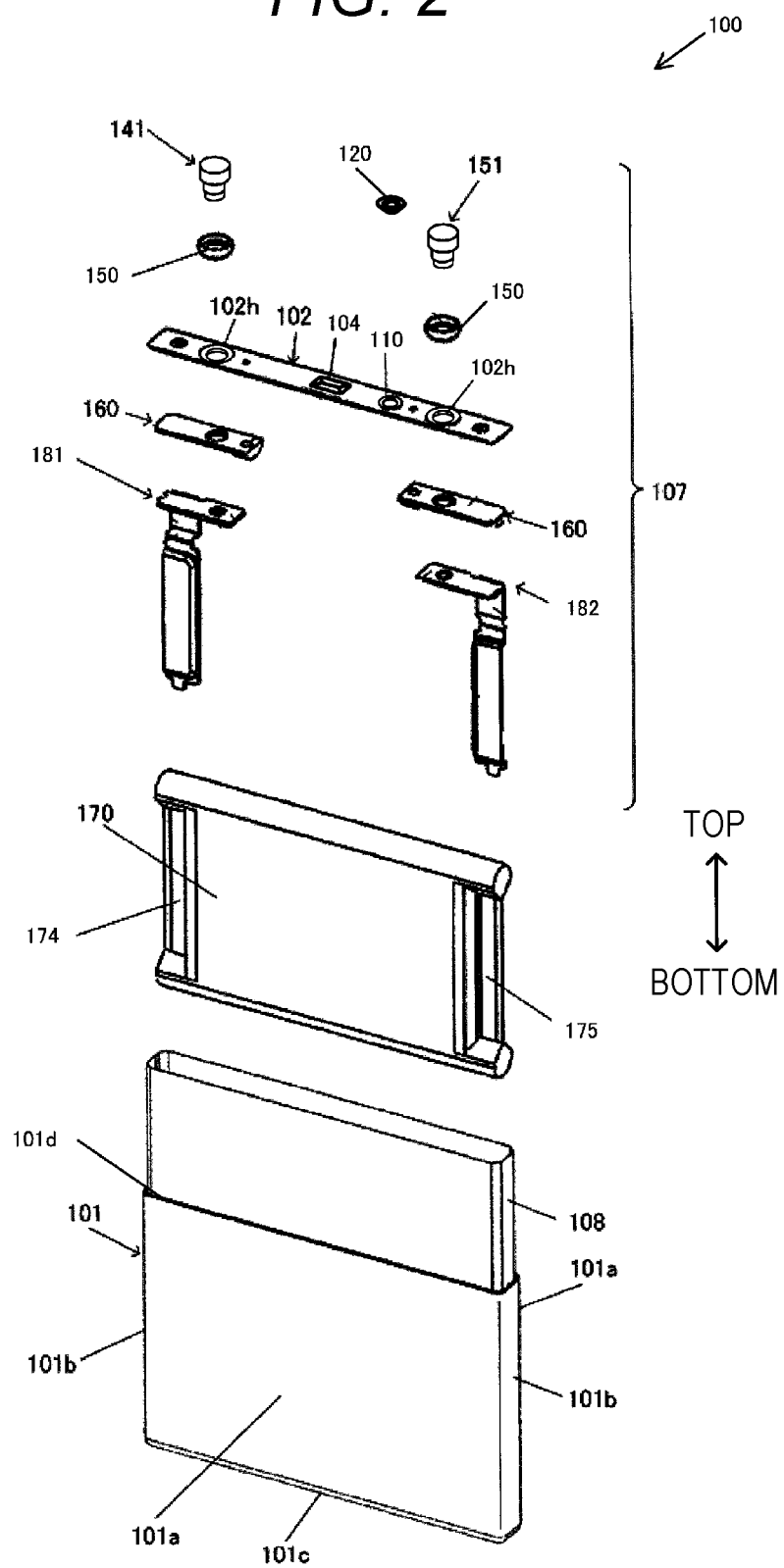
FIG. 2 is an exploded perspective view of the rectangular secondary battery illustrated in FIG. 1.

FIG. 1 is an external perspective view of a rectangular secondary battery as a first embodiment of the electric storage device according to the present invention, and FIG. 2 is an exploded perspective view of the rectangular secondary battery illustrated in FIG. 1. In the following description, the rectangular secondary battery will be described as a lithium ion rectangular secondary battery. Meanwhile, an up-down direction is specified as illustrated in the figures for convenience of description.

As illustrated in FIG. 1, a rectangular secondary battery 100 includes a rectangular battery container (container) 103 including a battery can 101 and a battery lid 102. A material for the battery can 101 and the battery lid 102 is an aluminum-based metal such as aluminum and an aluminum alloy.

The battery lid 102 is formed in a rectangular flat-plate shape and is connected to close an opening portion 101d (refer to FIG. 2) of the battery can 101. That is, the battery lid 102 seals the battery can 101. The battery lid 102 is provided with a positive-electrode terminal 141 and a negative-electrode terminal 151. The battery lid 102 is provided with a gas exhaust valve 104. The gas exhaust valve 104 is formed, e.g., by partially thinning the battery lid 102 by means of press work. The gas exhaust valve 104 is provided with a fissure so that a large opening may be formed at the time of fissuring. When the rectangular secondary battery 100 is heated due to an abnormality such as overcharge to cause gas to be generated therein, and pressure in the battery container 103 increases and reaches predetermined pressure, the gas exhaust valve 104 fissures and exhausts gas from the inside to decrease the pressure in the battery container 103.

As illustrated in FIG. 2, the battery lid 102 is provided with an opening portion for liquid injection (hereinbelow referred to as a liquid injecting portion 110) adapted to inject an electrolyte into the battery container 103. As the electrolyte, a non-aqueous electrolyte in which lithium salt such as lithium hexafluorophosphate ($LiPF_6$) is dissolved in a carbonate-ester-based organic solvent such as ethylene carbonate can be used.

The liquid injecting portion 110 includes a liquid injecting hole 111 (refer to FIG. 4) connecting an inside of the battery container 103 with an outside thereof and is sealed by a sealing plug 120 after the electrolyte is injected via the liquid injecting hole 111. A sealing structure of the liquid injecting hole 111 by the sealing plug 120 and a sealing method will be described in detail below.

As illustrated in FIG. 2, the battery can 101 houses an electric generating element 170. The battery can 101 includes a pair of wide surfaces 101a, a pair of narrow surfaces 101b, and a bottom surface 101c and is formed in a rectangular box shape with an upper surface opened. The electric generating element 170 is housed in the battery can 101 in a state of being covered with an insulating case 108. A material for the insulating case 108 is an insulating plastic such as polypropylene. Thus, the battery can 101 and the electric generating element 170 are electrically insulated from each other.

The positive-electrode terminal 141 is electrically connected to a positive electrode 174 of the electric generating element 170 via a positive-electrode current collector 181 while the negative-electrode terminal 151 is electrically connected to a negative electrode 175 of the electric generating element 170 via a negative-electrode current collector 182. Thus, electric power is supplied to an external load via the positive-electrode terminal 141 and the negative-electrode terminal 151, or externally generated power is supplied to the electric generating element 170 via the positive-electrode terminal 141 and the negative-electrode terminal 151 to charge the electric generating element 170.

A battery lid assembly 107 is configured to include the battery lid 102, the positive-electrode terminal 141 and the negative-electrode terminal 151 respectively attached to through holes 102h as a pair provided in the battery lid 102, the positive-electrode current collector 181 and the negative-electrode current collector 182, a pair of gaskets 150, and a pair of insulating members 160.

A material for the positive-electrode terminal 141 and the positive-electrode current collector 181 is aluminum or an aluminum alloy. A material for the negative-electrode terminal 151 and the negative-electrode current collector 182 is copper or a copper alloy. A material for the insulating members 160 and the gaskets 150 is an insulating plastic such as polyethylene terephthalate, polyphenylene sulfide, and perfluoroalkoxy fluoroplastic.

Figure 3:
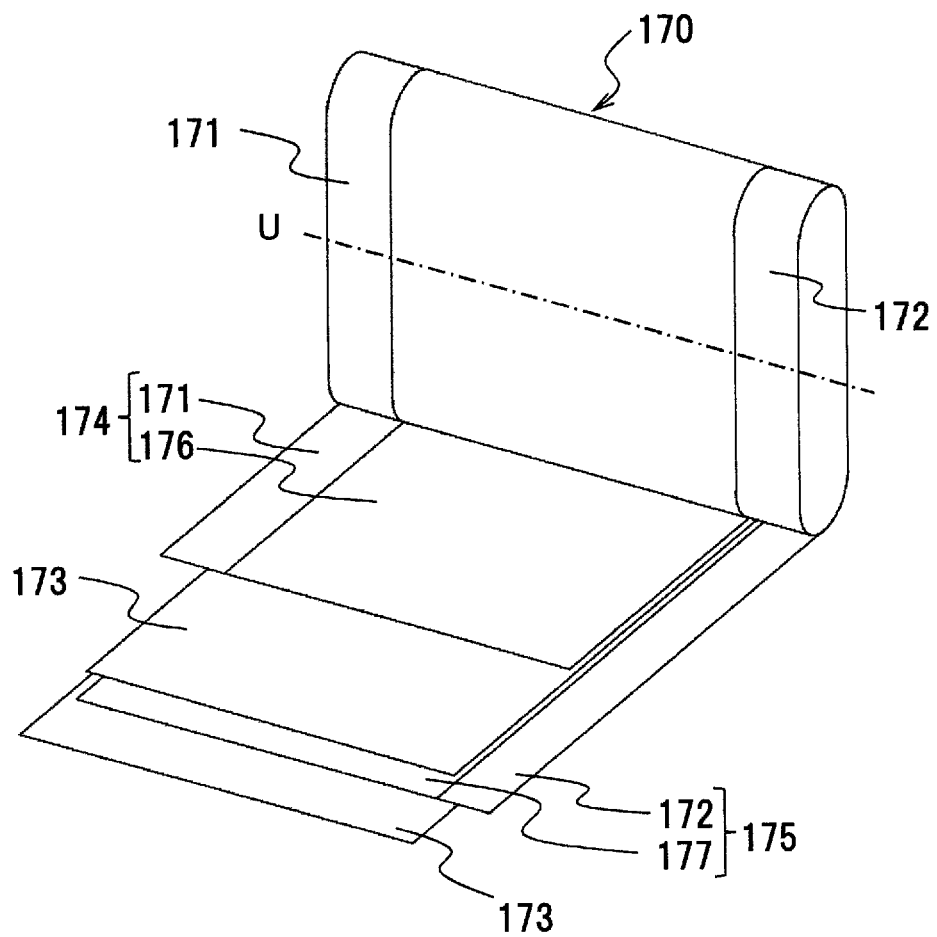
FIG. 3 is a perspective view of an electric generating element illustrated in FIG. 2 in a state in which a winding end side thereof is spread out.

The electric generating element 170 will be described with reference to FIG. 3. FIG. 3 is a perspective view of the electric generating element 170 illustrated in FIG. 2 in a state in which a winding end side thereof is spread out.

The electric generating element 170, which also serves as an electric storage element, has a laminated structure by winding the elongated positive electrode 174 and negative electrode 175 around a winding axis U in a flat shape with a separator 173 interposed therebetween, as illustrated in FIG. 3. The electric generating element 170 is a flat-shaped winding electrode group in which arc portions each having a half-arc-like cross section are formed at both ends, and in which substantially flat portions are formed between the ends.

The positive electrode 174 includes a positive-electrode foil 171 and a positive-electrode active material combined agent layer 176 formed by applying a positive-electrode active material combined agent, prepared by mixing a positive-electrode active material with a binder, on both surfaces of the positive-electrode foil 171. The negative electrode 175 includes a negative-electrode foil 172 and a negative-electrode active material combined agent layer 177 formed by applying a negative-electrode active material combined agent, prepared by mixing a negative-electrode active material with a binder, on both surfaces of the negative-electrode foil 172. Charge and discharge are performed between the positive-electrode active material and the negative-electrode active material.

The positive-electrode foil 171 is an aluminum alloy foil having thickness of about 20 to 30 μm, and the negative-electrode foil 172 is a copper alloy foil having thickness of about 15 to 20 μm. A material for the separator 173 is a porous polyethylene plastic. The positive-electrode active material is a lithium-containing transition metal compound oxide such as lithium manganese oxide, and the negative-electrode active material is a carbon material that can absorb/desorb lithium ions in a reversible manner such as graphite.

Among both end portions of the electric generating element 170 in a width direction (a direction of the winding axis U perpendicular to a winding direction), one end is a part in which a non-applying portion (an exposed portion of the positive-electrode foil 171) provided with no positive-electrode active material combined agent layer 176 is laminated. Also, the other end is apart in which a non-applying portion (an exposed portion of the negative-electrode foil 172) provided with no negative-electrode active material combined agent layer 177 is laminated. A laminated body of the non-applying portion on the positive electrode side and a laminated body of the non-applying portion on the negative electrode side are respectively squashed and connected to the positive-electrode current collector 181 and the negative-electrode current collector 182 (refer to FIG. 2) of the battery lid assembly 107 by means of ultrasonic bonding and are integrated with the battery lid assembly 107.

Figure 4:
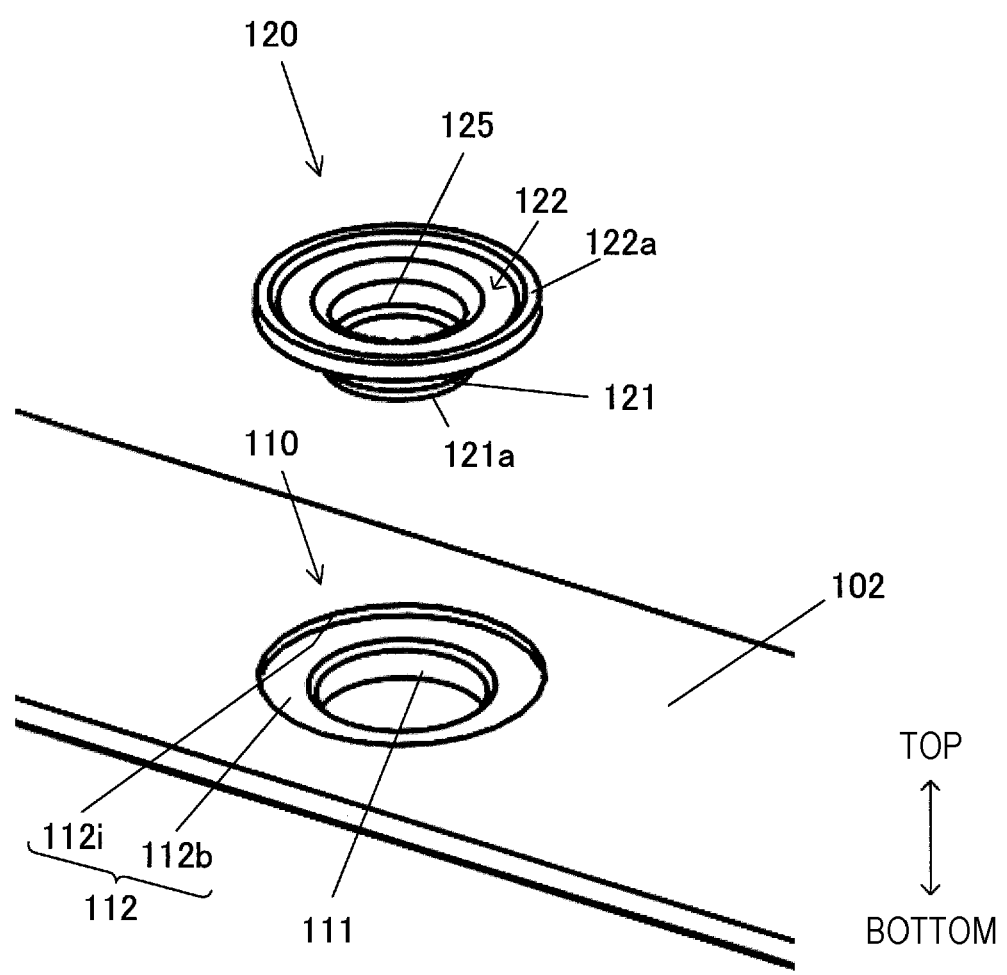
FIG. 4 is an enlarged exploded perspective view of a sealing structure illustrating a sealing plug and a liquid injecting portion.

Shapes of the sealing plug 120 and the liquid injecting portion 110 will be described. FIG. 4 is an enlarged exploded perspective view of the sealing structure illustrating the sealing plug 120 and the liquid injecting portion 110.

The liquid injecting portion 110 includes a circular recessed portion 112 provided to be recessed on an external surface of the battery lid 102 and the circular liquid injecting hole 111 formed from a bottom surface 112b of the recessed portion 112 to penetrate in a thickness direction of the battery lid 102. The recessed portion 112 and the liquid injecting hole 111 are formed concentrically. In other words, the liquid injecting portion 110 serving as the opening portion for liquid injection is a stepped hole including the recessed portion 112 constituting a large-diameter opening portion and the liquid injecting hole 111 constituting a small-diameter opening portion. The recessed portion 112 is provided on an upper surface (an external portion of the battery container 103) side of the battery lid 102 constituting one side surface of the battery container 103 to be recessed in an inward direction of the battery container 103. The recessed portion 112 is formed, e.g., by means of counter boring. The recessed portion 112 includes the bottom surface 112b and a side surface (hereinbelow referred to as an inner circumferential side surface 112i) erecting from an outer circumferential edge of the bottom surface 112b. The bottom surface 112b of the recessed portion 112 is a surface on which a flange portion (a fitting portion) 122 of the sealing plug 120 is to abut.

The sealing plug 120 is made of an aluminum-based metal such as aluminum and an aluminum alloy. The sealing plug 120 includes a cylindrical portion 121 including a bottom portion 121a and formed in a cylindrical shape and the annular flange portion 122 formed on an outer circumference of an upper portion of the cylindrical portion 121. The flange portion 122 and the cylindrical portion 121 are formed concentrically. In other words, the sealing plug 120 is formed in a stepped shape including the flange portion 122 constituting a large diameter portion and the cylindrical portion 121 constituting a small diameter portion. A rim portion of the flange portion 122 is a projecting portion 122a (refer to FIGS. 6(a) and 6(b)) projecting upward (to an outward side of the battery container 103) from the external surface of the battery lid 102 when the sealing plug 120 is arranged in the liquid injecting portion 110, and the projecting portion 122a is provided over the entire circumference of the flange portion 122. The cylindrical portion 121 and a center portion of the flange portion 122 of the sealing plug 120 are provided with a hollow portion 125 opened on a side of the flange portion 122, and the sealing plug 120 is formed approximately in a hat shape.

Figure 5:
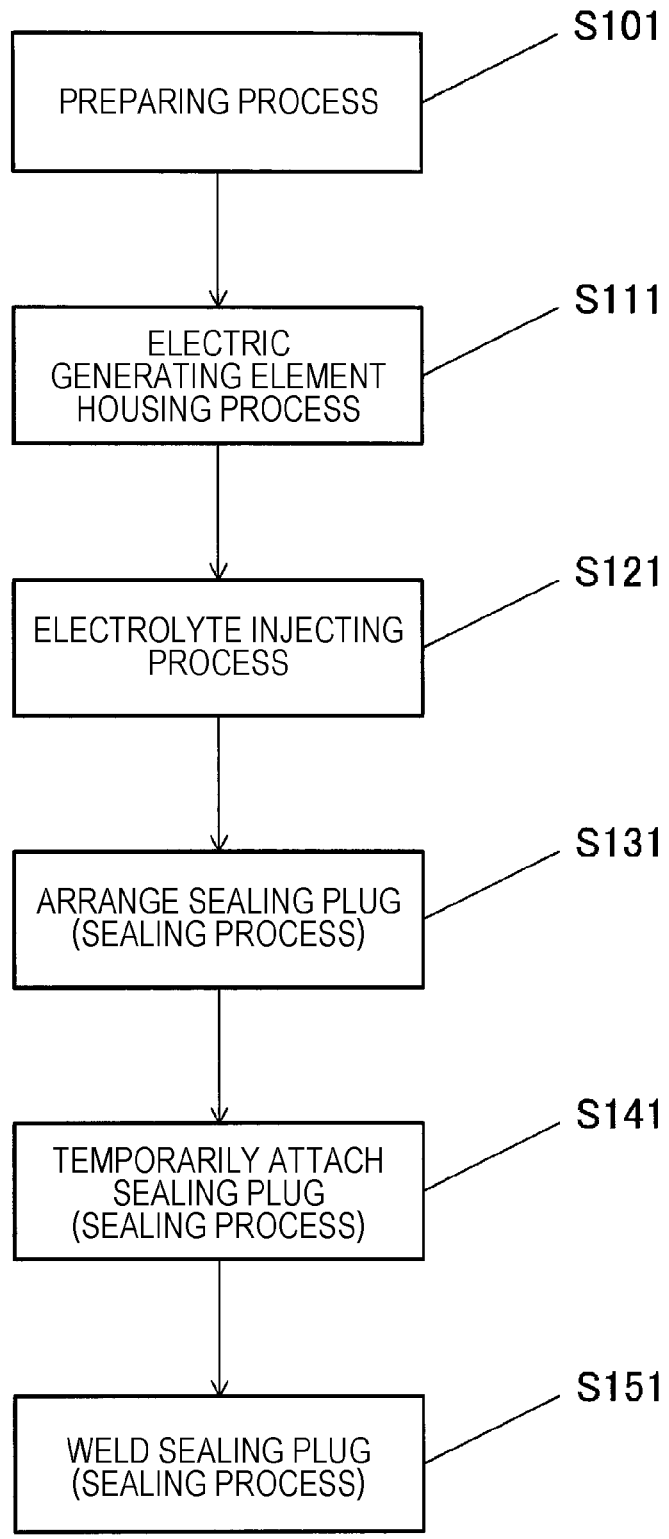
FIG. 5 is a flowchart illustrating a procedure for manufacturing a rectangular secondary battery 100.

A method for manufacturing the rectangular secondary battery 100 according to the first embodiment will be described. FIG. 5 is a flowchart illustrating a procedure for manufacturing the rectangular secondary battery 100. The method for manufacturing the rectangular secondary battery 100 includes a preparing process S101, a housing process S111 for housing the electric generating element 170 into the battery container, a liquid injecting process S121 for injecting the electrolyte from the liquid injecting hole 111 into the battery container, and sealing processes S131, S141, and S151 for sealing the liquid injecting hole 111 by using the sealing plug 120.

—Preparing Process—

In the preparing process S101, the battery can 101, the electric generating element 170 integrated with the battery lid assembly 107, and the sealing plug 120 are prepared.

—Housing Process—

In the housing process S111, the electric generating element 170 integrated with the battery lid assembly 107 is housed into the insulating case 108 housed in the battery can 101. At this time, the electric generating element 170 is housed into the battery can 101 so that the winding axis U may be parallel to the bottom surface 101c of the battery can 101, and so that the flat portions as a pair may be parallel to the wide surfaces 101a of the battery can 101. The opening portion 101d of the battery can 101 is closed by the battery lid 102 of the battery lid assembly 107, and a rim of the battery lid 102 is connected with an opening rim of the battery can 101 by means of laser beam welding or the like.

—Liquid Injecting Process—

In the liquid injecting process S121, the battery container 103 is mounted on a not-illustrated flat table so that the battery lid 102 may be on an upper side, and a liquid injecting jig (not illustrated) having two functions of decompression of the battery container and electrolyte injection is attached to the liquid injecting hole 111. The battery container 103 is decompressed until internal pressure of the battery container 103 reaches, e.g., about 27 kPa, and a predetermined amount of the electrolyte is thereafter injected.

—Sealing Process—

The sealing process for sealing the liquid injecting hole 111 by using the sealing plug 120 includes an arranging process S131 for arranging the sealing plug 120 in the liquid injecting portion 110, a temporarily attaching process S141 for temporarily attaching the sealing plug 120 to the liquid injecting portion 110, and a welding process S151 for welding the sealing plug 120 to the liquid injecting portion 110 to seal the liquid injecting hole 111.

Referring to FIGS. 6(a) to 9(b), a sealing method for sealing the liquid injecting hole 111 by using the sealing plug 120 and a sealing structure will be described in detail. FIGS. 6(a), 6(b), 7(a), and 7(b) are schematic cross-sectional views illustrating the sealing structure of the liquid injecting hole 111, and FIGS. 8(a), 8(b), 9(a), and 9(b) are schematic plan views of the battery lid 102 seen from an upper side. FIG. 6(a) illustrates a cross-section cut along the line VIa-VIa in FIG. 8(a), and FIGS. 6(b) and 7(a) illustrate cross-sections along the line VIb-VIb in FIG. 8(b). FIG. 7(b) illustrates a cross-section along the line VII-VII in FIG. 9(b). Meanwhile, FIGS. 8(a), 8(b), 9(a), and 9(b) omit illustration of the hollow portion 125.

—Arranging Process—

Figure 8A:
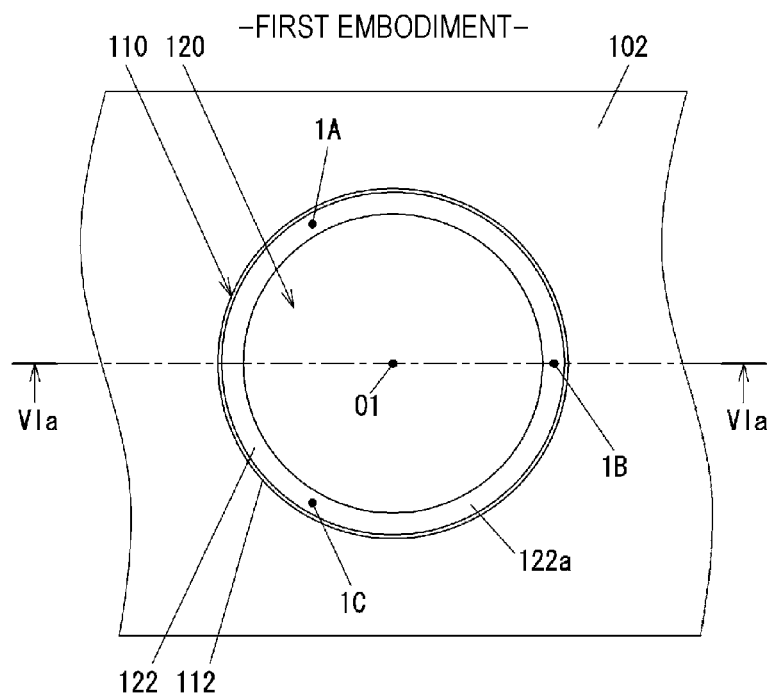
FIGS. 8A and 8B are schematic plan views illustrating a state in which the sealing plug is arranged in the liquid injecting portion.

FIGS. 6(a) and 8(a) illustrate a state in which the sealing plug 120 is arranged in the liquid injecting portion 110. In the arranging process S131 for arranging the sealing plug 120 in the liquid injecting portion 110, the cylindrical portion (inserting portion) 121 of the sealing plug 120 is inserted into the liquid injecting hole 111, and the flange portion (fitting portion) 122 is fitted into the recessed portion 112, as illustrated in FIGS. 6(a) and 8(a). As illustrated in FIG. 6(a), an outside diameter do1 of the flange portion 122 constituting the large diameter portion of the sealing plug 120 is slightly shorter than an inside diameter Di1 of the recessed portion 112 constituting the large-diameter opening portion of the liquid injecting portion 110 (do1<Di1). An outside diameter do2 of the cylindrical portion 121 constituting the small diameter portion of the sealing plug 120 is slightly shorter than an inside diameter Di2 of the liquid injecting hole 111 constituting the small-diameter opening portion of the liquid injecting portion 110 (do2<Di2). Thus, in a state in which the sealing plug 120 is arranged in the liquid injecting portion 110, a gap c1 is formed between an outer circumferential side surface 122o of the flange portion (large diameter portion) 122 and an inner circumferential side surface 112i of the recessed portion (large-diameter opening portion) 112, and a gap c2 is formed between an outer circumferential side surface 121o of the cylindrical portion (small diameter portion) 121 and an inner circumferential side surface 111i of the liquid injecting hole (small-diameter opening portion) 111.

—Temporarily Attaching Process—

Figure 8B:
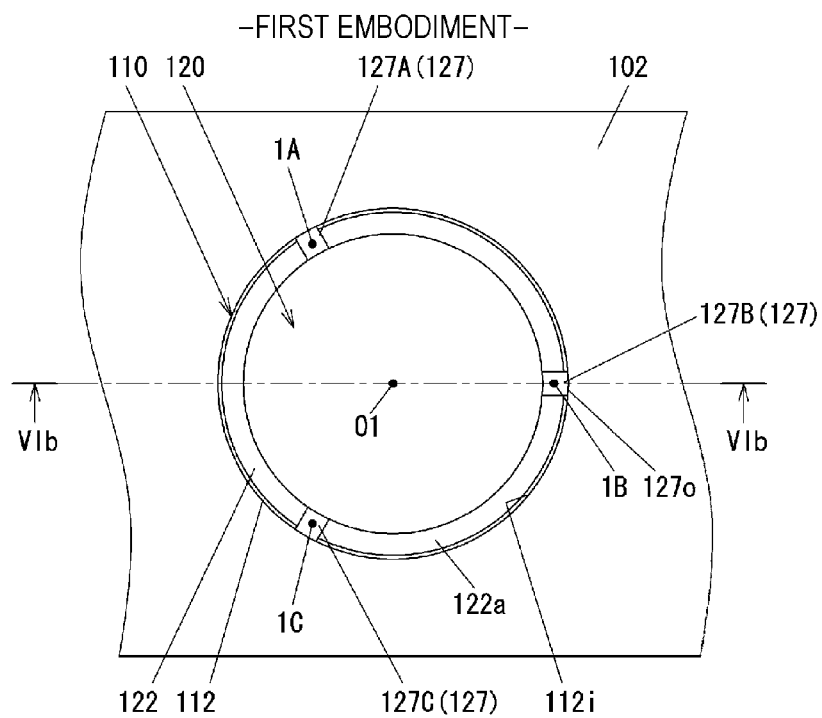

FIGS. 6(b) and 8(b) illustrate a state in which the sealing plug 120 is temporarily attached to the liquid injecting portion 110. In the temporarily attaching process S141 for temporarily attaching the sealing plug 120 to the liquid injecting portion 110, in the projecting portion 122a constituting the rim portion of the flange portion 122, a first position 1A, a second position 1B, and a third position 1C set at regular intervals in a circumferential direction are respectively pressed by pressing jigs 190 from an upper side (the outward side of the battery container 103) to form plastic deformation portions 127A, 127B, and 127C, as illustrated in FIGS. 6(a), 6(b), 8(a), and 8(b).

Each of the pressing jigs 190 has a pressing portion 191 formed in a rectangular solid shape, and a lower surface of the pressing portion 191 is a flat surface. The three pressing jigs 190 are prepared and arranged on upper sides of the first position 1A, the second position 1B, and the third position 1C, respectively. At the respective predetermined positions 1A, 1B, and 1C, when the lower surfaces of the pressing portions 191 abut on the upper surface of the projecting portion 122a and are pressed downward, the projecting portion 122a at the respective predetermined positions 1A, 1B, and 1C is compressed in an up-down direction and is deformed to spread outward in a radial direction, and the plastic deformation portions 127A, 127B, and 127C are formed, as illustrated in FIGS. 6(b) and 8(b).

Figure 9A:
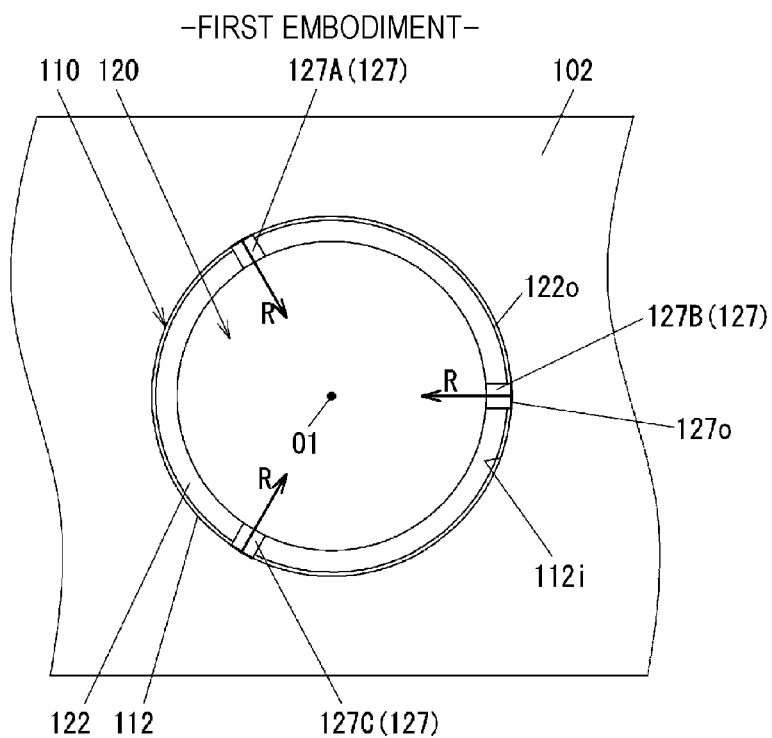
FIGS. 9A and 9B are illustrates forces acting on the sealing plug, and is a schematic plan view illustrating a state in which the sealing plug has been welded to the liquid injecting portion.

When the projecting portion 122a is deformed and spreads in the radial direction, an outer circumferential side surface 127o of the plastic deformation portion 127 abuts on the inner circumferential side surface 112i of the recessed portion 112, and a reaction force R from the inner circumferential side surface 112i of the recessed portion 112 acts on the outer circumferential side surface 127o of the plastic deformation portion 127. FIG. 9(a) illustrates forces acting on the sealing plug 120. As illustrated schematically with arrows in FIG. 9(a), the reaction forces R act toward a center axis O1 of the sealing plug 120. Since the reaction forces R from the inner circumferential side surface 112i of the recessed portion 112 uniformly act on the outer circumferential side surfaces 127o of the respective plastic deformation portions 127A, 127B, and 127C, the sealing plug 120 is positioned (or centered) so that the center axis O1 of the sealing plug 120 may correspond to a center axis of the liquid injecting hole, and the sealing plug 120 is fixed in the liquid injecting portion 110.

Meanwhile, the outer circumferential side surfaces 127o of the plastic deformation portions 127 constituting the outer circumferential side surface 122o of the flange portion 122 at the respective predetermined positions 1A, 1B, and 1C surface-contact the inner circumferential side surface 112i of the recessed portion 112.

—Welding Process—

Figure 7A:
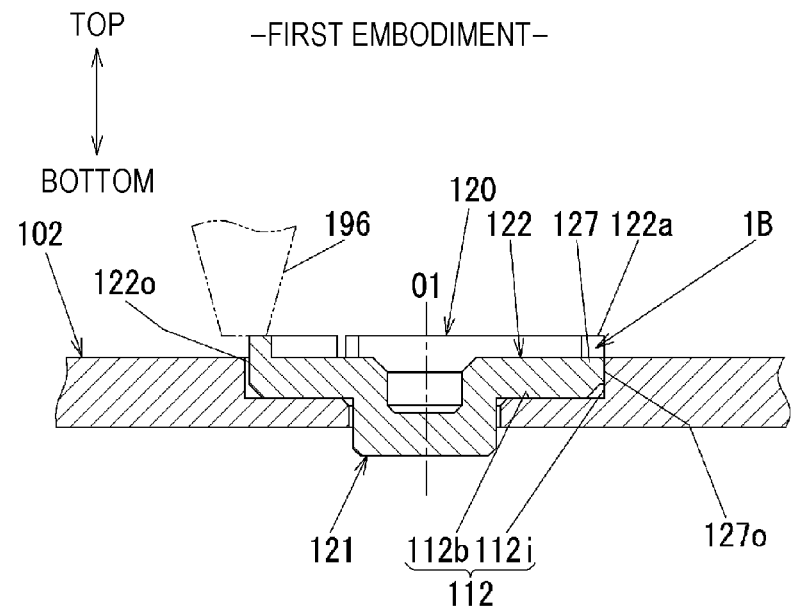
FIGS. 7A and 7B are schematic cross-sectional views illustrating a state in which the sealing plug is laser-welded to the liquid injecting portion.
Figure 7B:
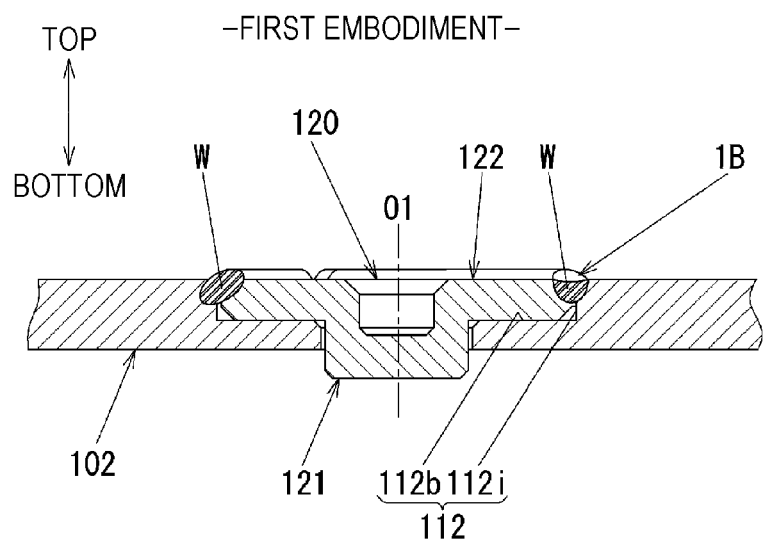
Figure 9B:
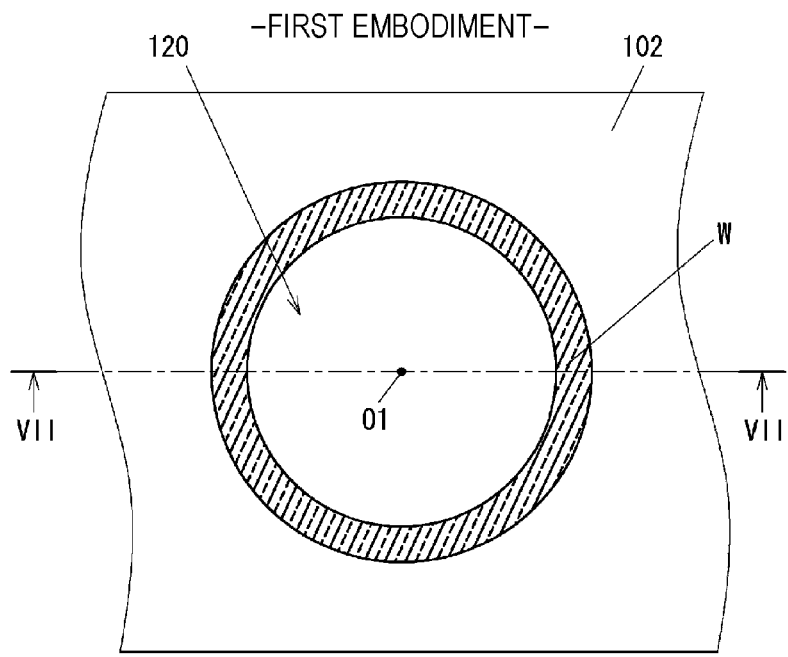

FIG. 7(a) illustrates a state in which the sealing plug 120 is welded to the liquid injecting portion 110. FIGS. 7(b) and 9(b) illustrate a state in which the sealing plug 120 has been welded to the liquid injecting portion 110. In the welding process S151 for welding the sealing plug 120 to the battery lid 102, a not-illustrated YAG pulse laser welding machine is used, and a laser beam is emitted with energy per pulse of 6 J, a pulse frequency of 60 pulses/sec., an average output of 360 W, and welding speed of 10 mm/sec, for example. As illustrated in FIG. 7(a), a laser beam 196 is emitted to a border between the outer circumferential side surface 122o of the flange portion 122 and the inner circumferential side surface 112i of the recessed portion 112 in a vertical direction to the external surface of the battery lid 102.

An area to be irradiated with the laser beam is moved along the outer circumferential side surface 122o of the flange portion 122, and the outer circumferential side surface 122o of the flange portion 122 and the inner circumferential side surface 112i of the recessed portion 112 are welded over the entire circumference. When the area to be irradiated with the laser beam is moved along the outer circumferential side surface 122o of the flange portion 122 from a welding start point, a weld pool at a part at which the welding operation is finished is gradually solidified during the movement. In the present embodiment, since the sealing plug 120 is temporarily attached to the liquid injecting portion 110, displacement of the sealing plug 120 caused by expansion when the weld pool is generated and contraction when the weld pool is solidified is prevented, and a favorable weld metal W can be formed over the entire circumference of the sealing plug 120 as illustrated in FIGS. 7(b) and 9(b). The weld metal W is formed to cause the liquid injecting portion 110 to be sealed by the sealing plug 120.

—Centering Conditions of Sealing Plug—

Referring to FIGS. 10(a) to 12(b), conditions for positioning the sealing plug 120 at the center of the liquid injecting portion 110 at the time of temporarily attaching the sealing plug 120, that is, centering conditions of the sealing plug 120, will be described. FIGS. 10(a) to 12(b) illustrate positions in which the plastic deformation portions 127 are formed. It is to be noted that FIGS. 10(a) to 12(b) omit illustration of the hollow portion 125.

In the present embodiment, the plastic deformation portions 127 are arranged to satisfy the following conditions A and B in order to center the sealing plug 120.

(Condition A) In each of n regions (n is an integer of at least 3) into which an outer circumference of the flange portion 122 or an inner circumference of the recessed portion 112 is equally divided, one or more plastic deformation portion(s) 127 is/are arranged.

(Condition B) In each of regions into which the outer circumference of the flange portion 122 or the inner circumference of the recessed portion 112 is halved with an arbitrary plastic deformation portion 127 set as a starting point, one or more plastic deformation portion(s) 127 other than the plastic deformation portion 127 serving as the starting point is/are arranged.

Hereinbelow, a case of forming the plastic deformation portions 127 in the flange portion 122 in a case in which n=3 will be raised as an example and described specifically.

Figure 10A:
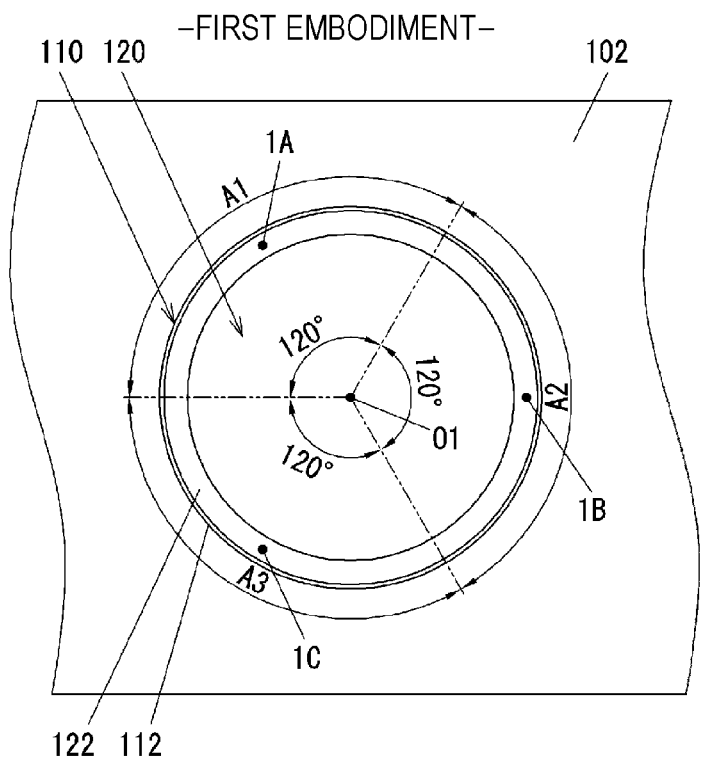
FIG. 10A illustrates three regions into which an outer circumference of a flange portion is equally divided.

As illustrated in FIG. 10(a), the outer circumference of the flange portion 122 in which the plastic deformation portions 127 are to be formed is equally divided into three to set three regions A1, A2, and A3 in the sealing plug 120. Each of the regions A1, A2, and A3 is a fan-shaped region with a center angle of 120 degrees.

Figure 10B:
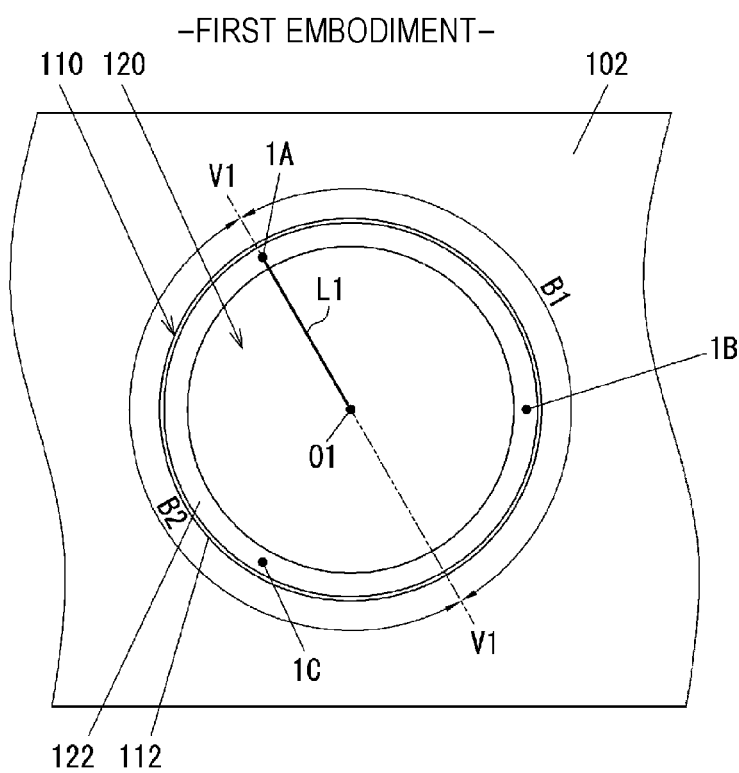
FIG. 10B illustrates regions into which the outer circumference of the flange portion is halved with a first position set as a starting point.

The outer circumference of the flange portion 122 in which the plastic deformation portions 127 are to be formed is halved with an arbitrary position out of the respective predetermined positions 1A, 1B, and 1C set as a starting point to set two regions in the sealing plug 120. As illustrated in FIG. 10(b), in a case in which the first position 1A is set as the starting point, a virtual plane V1, including a line segment L1 connecting the first position 1A with the center axis O1 of the sealing plug 120 and the center axis O1 of the sealing plug 120, is set, the outer circumference of the flange portion 122 is halved by the virtual plane V1, and two regions B1 and B2 are set in the sealing plug 120. Each of the regions B1 and B2 is a semicircular region with a center angle of 180 degrees.

Figure 11A:
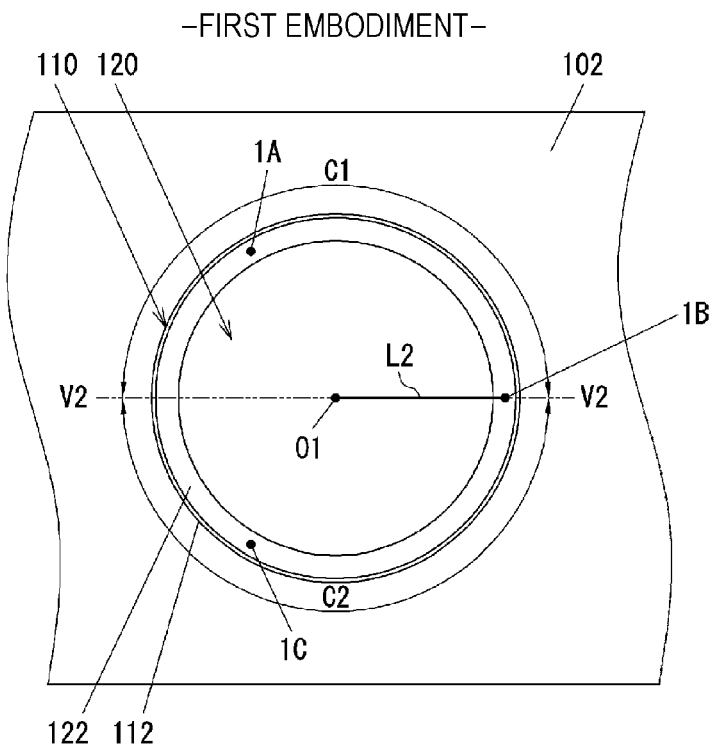
FIG. 11A illustrates regions into which the outer circumference of the flange portion is halved with a second position set as the starting point.

As illustrated in FIG. 11(a), in a case in which the second position 1B is set as the starting point, a virtual plane V2, including a line segment L2 connecting the second position 1B with the center axis O1 of the sealing plug 120 and the center axis O1 of the sealing plug 120, is set, the outer circumference of the flange portion 122 is halved by the virtual plane V2, and two regions C1 and C2 are set in the sealing plug 120. Each of the regions C1 and C2 is a semicircular region with a center angle of 180 degrees.

Figure 11B:
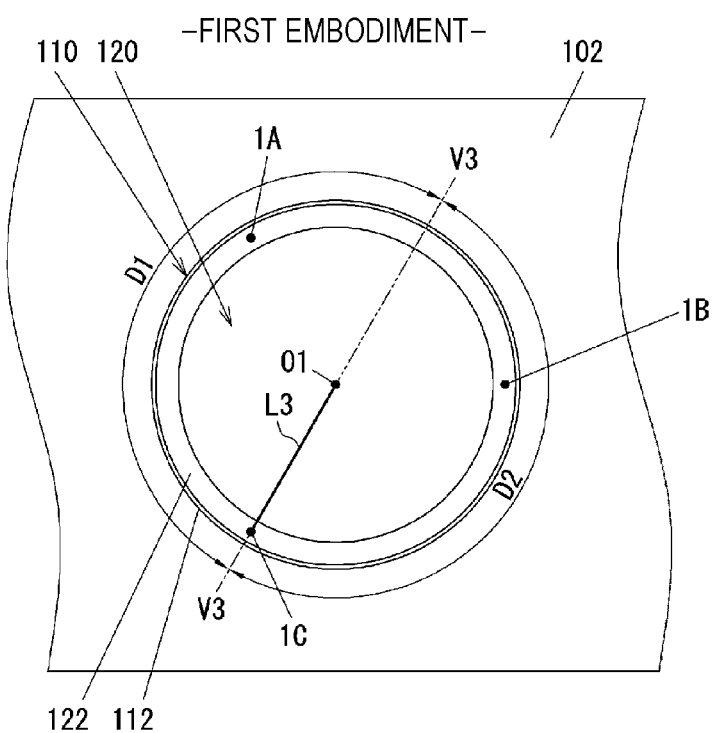
FIG. 11B illustrates regions into which the outer circumference of the flange portion is halved with a third position set as the starting point.

As illustrated in FIG. 11(b), in a case in which the third position 1C is set as the starting point, a virtual plane V3, including a line segment L3 connecting the third position 1C with the center axis O1 of the sealing plug 120 and the center axis O1 of the sealing plug 120, is set, the outer circumference of the flange portion 122 is halved by the virtual plane V3, and two regions D1 and D2 are set in the sealing plug 120. Each of the regions D1 and D2 is a semicircular region with a center angle of 180 degrees.

Figure 12A:
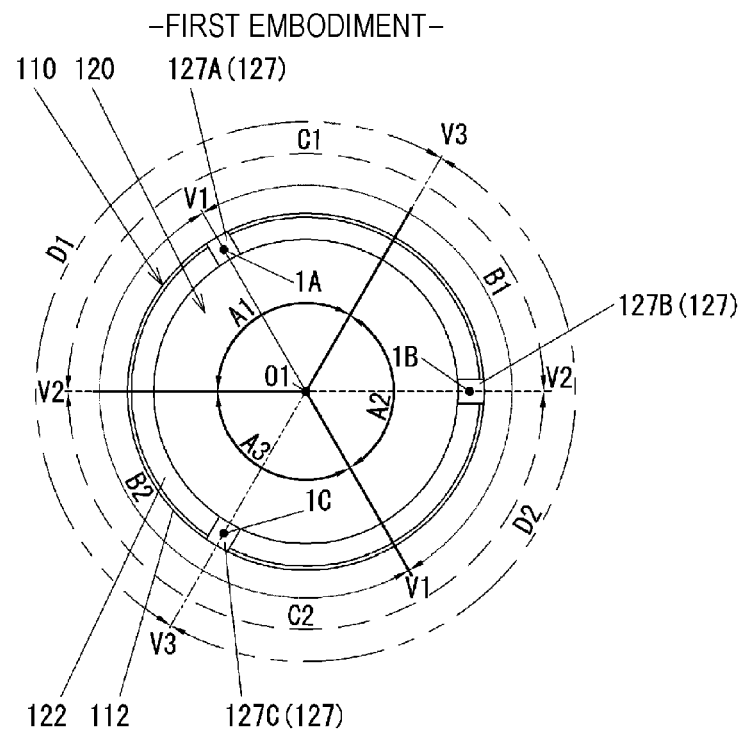
FIG. 12A illustrates relationship between the first position, the second position, and the third position, and the respective regions.

As illustrated in FIG. 12(a), (i) the first position 1A is set in the region A1, the region C1, and the region D1, (ii) the second position 1B is set in the region A2, the region B1, and the region D2, and (iii) the third position 1C is set in the region A3, the region B2, and the region C2.

When the predetermined positions 1A, 1B, and 1C are set, and the plastic deformation portions 127 are formed in the respective predetermined positions 1A, 1B, and 1C as described above, the plastic deformation portions 127 are formed in positions satisfying the conditions A and B. By arranging the plastic deformation portions 127 in this manner, when the sealing plug 120 is halved along an arbitrary virtual plane including the center axis O1 of the sealing plug 120, at least one plastic deformation portion 127 is arranged in each region.

For example, in a case in which the sealing plug 120 is halved along a virtual plane P1, the plastic deformation portion 127B is arranged in one region while the plastic deformation portions 127A and 127C are arranged in the other region. Also, in a case in which the sealing plug 120 is halved along a virtual plane P2, the plastic deformation portions 127A and 127B are arranged in one region while the plastic deformation portion 127C is arranged in the other region. In other words, in the present embodiment, when the sealing plug 120 is halved along a virtual plane including the center axis O1 of the sealing plug 120, unbalanced arrangement of the plastic deformation portions 127 only in one region is prevented. As a result, as illustrated in FIG. 12(b), pressing forces (the reaction forces R) toward the center of the liquid injecting hole 111 act on the outer circumferential side surface of the sealing plug 120, and the sealing plug 120 can be temporarily attached to the liquid injecting portion 110 while being centered.

Figure 12B:
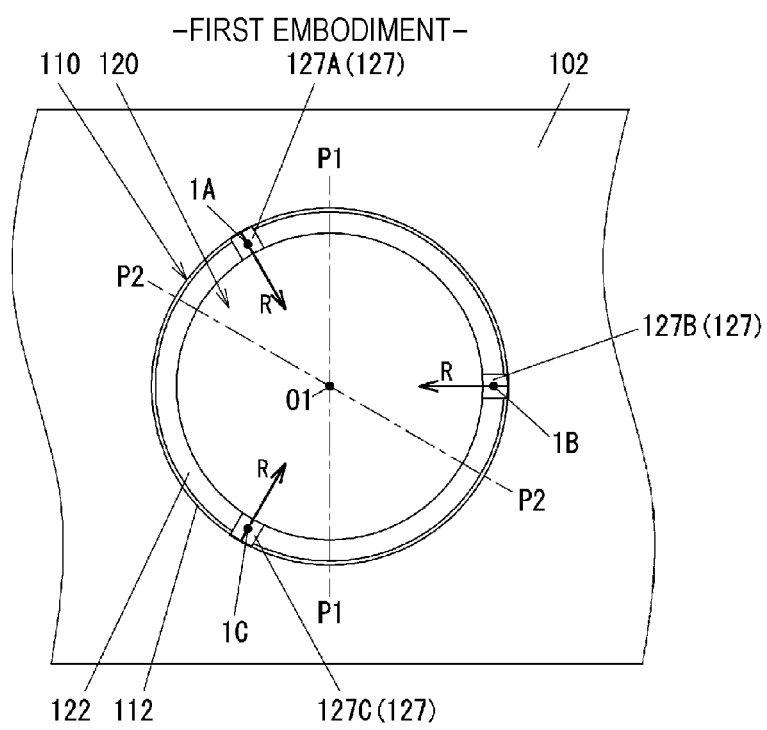
FIG. 12B illustrates forces acting on the sealing plug.
Figure 13A:
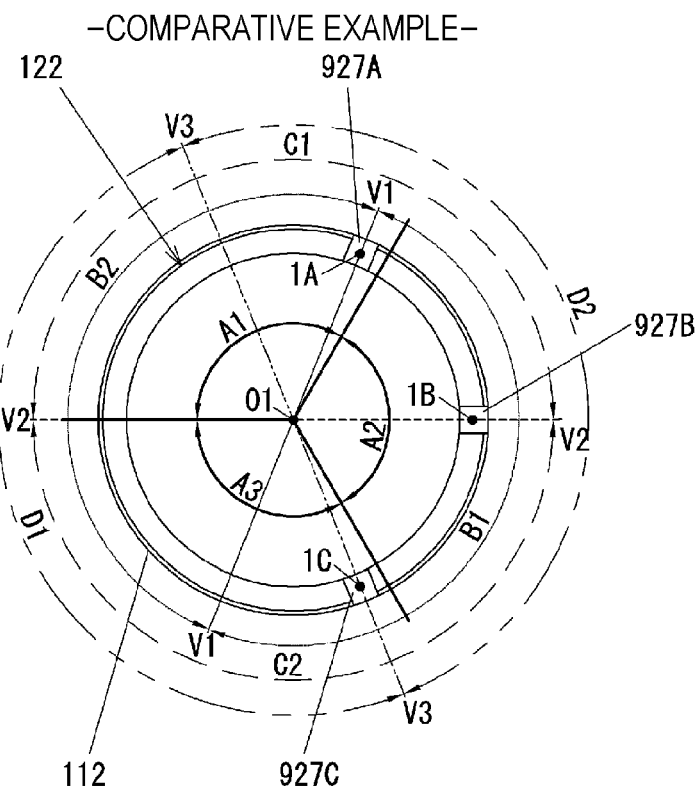
FIGS. 13A and 13B illustrate a comparative example of FIGS. 12A and 12B.
Figure 13B:
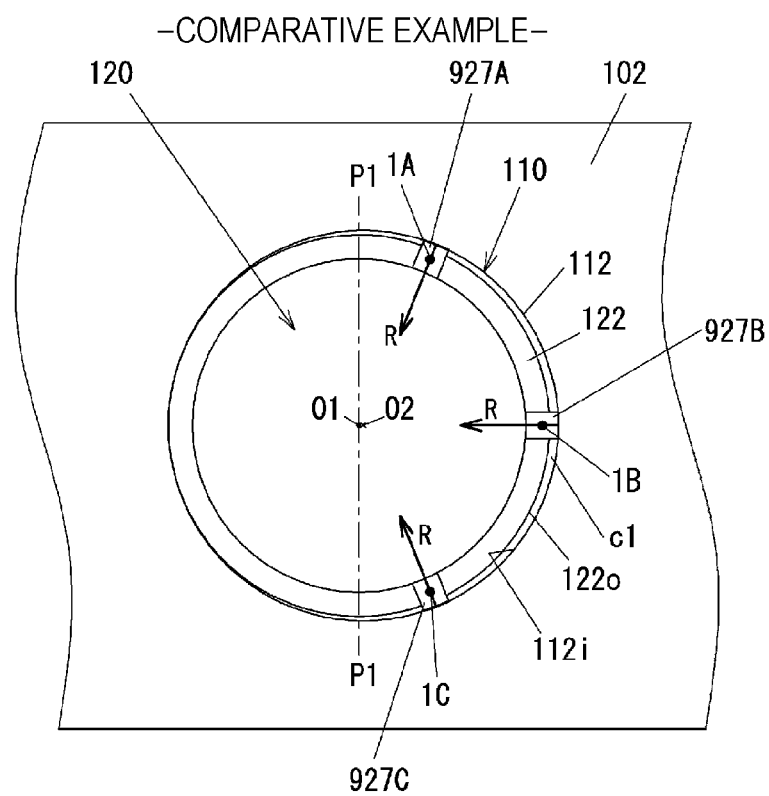

FIGS. 13(a) and 13(b) illustrate a comparative example of FIGS. 12(a) and 12(b). As illustrated in FIG. 13(a), in the comparative example, plastic deformation portions 927A, 927B, and 927C are arranged in the regions A1, A2, and A3, respectively, and the condition A is satisfied. However, in one region B1 out of the regions B1 and B2 into which the outer circumference of the flange portion 122 is halved with the plastic deformation portion 927A set as the starting point, all the plastic deformation portions 927B and 927C except the plastic deformation portion 927A serving as the starting point are arranged in a concentrated manner. In the other region B2, the plastic deformation portions 927B and 927C except the plastic deformation portion 927A serving as the starting point are not arranged. That is, in the comparative example, the condition B is not satisfied.

Accordingly, as illustrated in FIG. 13(b), when the sealing plug 120 is halved along an arbitrary virtual plane such as the virtual plane P1 including the center axis O1 of the sealing plug 120, the plastic deformation portions 927A, 927B, and 927C are arranged only in one region (the region on the right side in the figure) while no plastic deformation portions are arranged in the other region (the region on the left side in the figure). Thus, in the comparative example, due to the reaction forces R acting on the sealing plug 120 from the respective plastic deformation portions 927A, 927B, and 927C, the sealing plug 120 moves toward a side (the left side in the figure) on which no plastic deformation portions are arranged, and the center axis O1 of the sealing plug 120 is located on the left side of a center axis O2 of the liquid injecting hole 111. As a result, on a side (the right side in the figure) on which the plastic deformation portions 927A, 927B, and 927C are arranged, the gap c1 between the outer circumferential side surface 122o of the flange portion 122 of the sealing plug 120 and the inner circumferential side surface 112i of the recessed portion 112 of the liquid injecting portion 110 is enlarged. Accordingly, in the comparative example, at a part having the large gap c1, a sufficient weld pool cannot be generated between the sealing plug 120 and the battery lid 102, and a weld defect such as a crack may be generated in the weld metal formed when the weld pool is solidified.

According to the aforementioned first embodiment, the following effects can be obtained.

(1) By forming the plurality of plastic deformation portions 127, the sealing plug 120 is temporarily attached to the liquid injecting portion 110 while being centered. In each of n regions (n=3) into which the outer circumference of the flange portion 122 is equally divided, each of the plastic deformation portions 127 is arranged. In addition, in each of regions into which the outer circumference of the flange portion 122 is halved with an arbitrary plastic deformation portion 127 set as the starting point, each of the plastic deformation portions 127 other than the plastic deformation portion 127 serving as the starting point is arranged. By doing so, the sealing plug 120 can be fixed in the liquid injecting portion 110 in a state in which the gap c1 between the outer circumferential side surface 122o of the flange portion 122 of the sealing plug 120 and the inner circumferential side surface 112i of the recessed portion 112 of the liquid injecting portion 110 is uniform over the entire circumference of the sealing plug 120. Accordingly, at the time of welding, displacement of the centered sealing plug 120 can be prevented, and the sufficient weld pool can be generated between the sealing plug 120 and the battery lid 102. As a result, the weld defect can be prevented from being generated in the weld metal W formed when the weld pool is solidified, and reliability of sealing of the sealing plug 120 can be improved.

(2) The rim portion of the flange portion 122 is the projecting portion 122a projecting to the outward side of the battery container 103 from the external surface of the battery lid 102. Accordingly, lack of the weld metal (weld pool) to be filled in the gap c1 between the outer circumferential side surface 122o of the flange portion 122 and the inner circumferential side surface 112i of the recessed portion 112 is prevented. In other words, the larger gap c1 can be provided in a case in which the projecting portion 122a is provided than in a case in which no projecting portion 122a is provided, and productivity can be improved.

(3) By bringing all of the three pressing jigs 190 into pressure contact with the projecting portion 122a at the same time, the respective plastic deformation portions 127A, 127B, and 127C are formed. Since the plurality of plastic deformation portions 127A, 127B, and 127C can be formed at a time, working efficiency is improved.

Second Embodiment

Figure 15A:
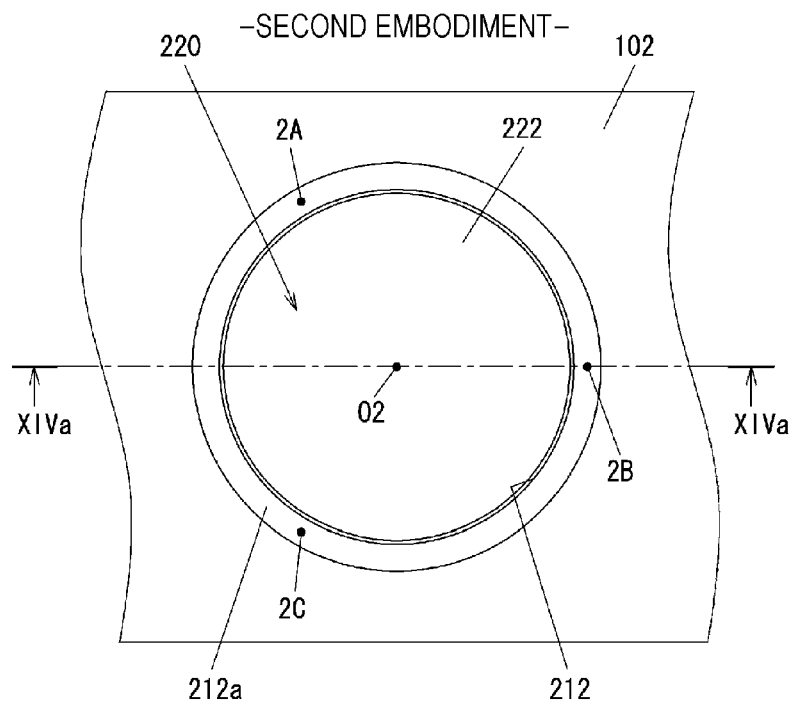
FIGS. 15A and 15B are schematic plan views describing the sealing method for sealing the liquid injecting hole by using the sealing plug in the electric storage device according to the second embodiment.
Figure 15B:
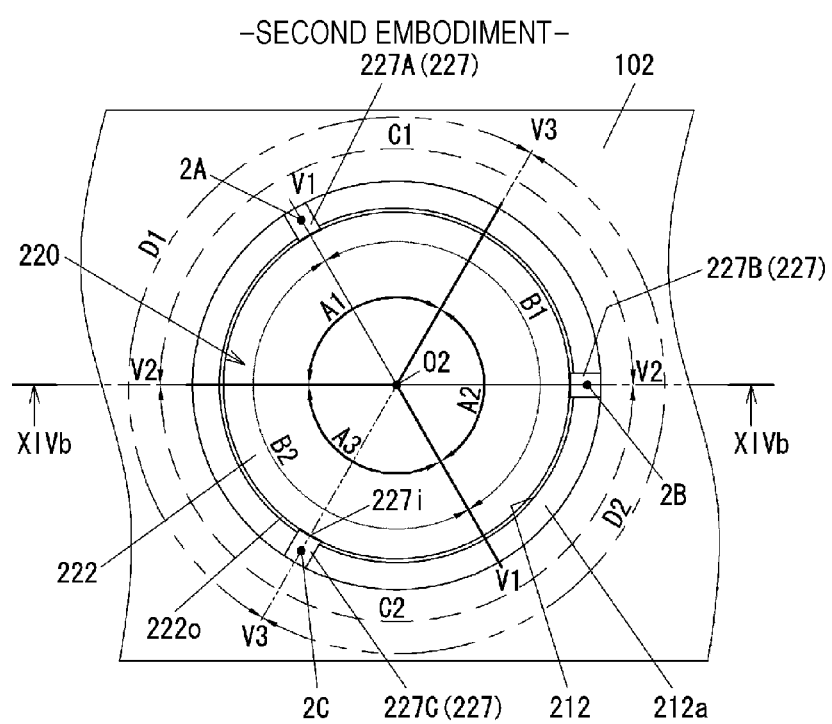

Referring to FIGS. 14(a) to 15(b), a sealing method for sealing a liquid injecting hole by using a sealing plug in an electric storage device according to a second embodiment will be described. In the figures, identical or corresponding components to those in the first embodiment are shown with the same reference numerals, and different points are described. FIGS. 14(a) and 14(b) are similar to FIGS. 6(a) and 7(a) and are schematic cross-sectional views describing a sealing method for sealing the liquid injecting hole 111 by using a sealing plug 220 in an electric storage device according to the second embodiment. FIGS. 15(a) and 15(b) are similar to FIGS. 8(a) and 12(a) and are schematic plan views describing the sealing method for sealing the liquid injecting hole 111 by using the sealing plug 220 in the electric storage device according to the second embodiment. FIG. 14(a) illustrates a cross-section cut along the line XIVa-XIVa in FIG. 15(a), and FIG. 14(b) illustrates a cross-section cut along the line XIVb-XIVb in FIG. 15(b).

In the first embodiment, the flange portion 122 is provided with the projecting portion 122a, and the projecting portion 122a is pressed at the first position 1A, the second position 1B, and the third position 1C to form the plastic deformation portions 127 (refer to FIGS. 6(a), 6(b), 8(a), and 8(b)). Conversely, in the second embodiment, a flange portion 222 of the sealing plug 220 is provided with no projecting portion as illustrated in FIGS. 14(a) and 15(a). In the second embodiment, a projecting portion 212a projecting upward (to an outward side of the battery container 103) from the battery lid 102 is provided at an opening rim portion of a recessed portion 212 in the battery lid 102 over the entire circumference of the recessed portion 212.

In the second embodiment, the projecting portion 212a constituting the opening rim portion of the recessed portion 212 in the battery lid 102 is pressed by the pressing jigs 190 at a first position 2A, a second position 2B, and a third position 2C to form plastic deformation portions 227A, 227B, and 227C as illustrated in FIGS. 14(b) and 15(b).

When the projecting portion 212a is pressed by the pressing jigs 190, the projecting portion 212a is compressed in the up-down direction and is deformed mainly inward in the radial direction of the liquid injection portion while the outward deforming amount thereof in the radial direction of the liquid injection portion is restricted, and inside surfaces 227i of the plastic deformation portions 227 press an outer circumferential side surface 222o of the flange portion 222 of the sealing plug 220. Since forces toward the center axis O2 of the liquid injecting hole 111 act on the sealing plug 220 at the respective predetermined positions 2A, 2B, and 2C, the sealing plug 220 is centered and temporarily attached to the liquid injecting portion so that a center axis of the sealing plug 220 may correspond to the center axis O2 of the liquid injecting hole.

In the second embodiment, in each of n regions A1, A2, and A3 (n=3) into which the inner circumference of the recessed portion 212 is equally divided, each of the plastic deformation portions 227 is arranged. In addition, in each of regions B1, B2, C1, C2, D1, and D2 into which the inner circumference of the recessed portion 212 is halved with an arbitrary plastic deformation portion 227 set as the starting point, each of the plastic deformation portions 227 other than the plastic deformation portion 227 serving as the starting point is arranged.

According to the second embodiment described above, similar effects to those in the first embodiment are obtained.

The following modification examples are within the scope of the present invention, and one or a plurality of the modification example(s) can be combined with each of the aforementioned embodiments.

(1) In each of the aforementioned first and second embodiments, an example in which the three pressing jigs 190 are brought into pressure contact with the projecting portion 122a or 212a at the same time to form the respective plastic deformation portions 127A, 127B, and 127C or 227A, 227B, and 227C has been described, and the present invention is not limited to this. The plastic deformation portion 127A or 227A, the plastic deformation portion 127B or 227B, and the plastic deformation portion 127C or 227C may be formed one by one sequentially. By forming the plastic deformation portions 127 or 227 one by one, the pressing forces applied to the battery lid 102 from the pressing jigs 190 can be reduced, and deformation of the battery lid 102 can be prevented. Meanwhile, in a case in which the battery lid 102 is not deformed even when the three pressing jigs 190 are brought into pressure contact with the battery lid 102 at the same time, working efficiency can be improved by bringing the three pressing jigs 190 into pressure contact at the same time.

(2) The respective predetermined positions 1A, 1B, and 1C at the rim portion of the flange portion 122 are pressed to form the plastic deformation portions 127 in the first embodiment while the respective predetermined positions 2A, 2B, and 2C at the opening rim portion of the recessed portion 212 are pressed to form the plastic deformation portions 227 in the second embodiment, and the present invention is not limited to these. The rim portion of the flange portion 122 or 222 and the opening rim portion of the recessed portion 112 or 212 may be pressed by the pressing jigs 190 at the same time to form the plastic deformation portions 127 and 227 at the flange portion 122 or 222 and the recessed portion 112 or 212.

(3) The rim portion of the flange portion 122 projects to the outward side of the battery container 103 from the battery lid 102 to form the projecting portion 122a in the first embodiment while the opening rim portion of the recessed portion 212 projects to the outward side of the battery container 103 from the battery lid 102 to form the projecting portion 212a in the second embodiment. The width and height of the projecting portion 122a or 212a are set to cause the sufficient weld pool to be generated so that the gap c1 can be buried with the weld metal even when a dimensional tolerance of the gap c1 is maximum. However, in a case in which the sufficient weld pool can be generated even without the projecting portion 122a or 212a, the projecting portion 122a or 212a may be omitted.

Figure 16A:
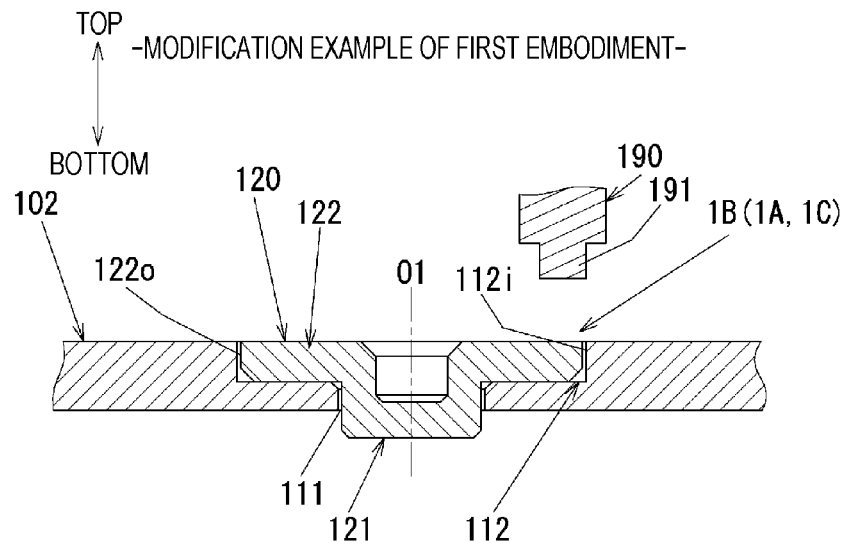
FIGS. 16A and 16B are schematic cross-sectional views describing a sealing method for sealing the liquid injecting hole by using the sealing plug in an electric storage device according to a modification example of the first embodiment.
Figure 16B:
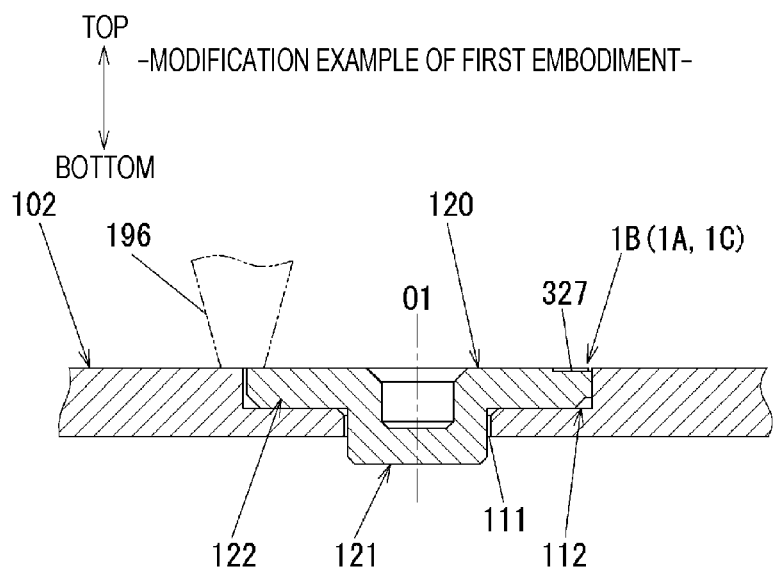
Figure 17A:
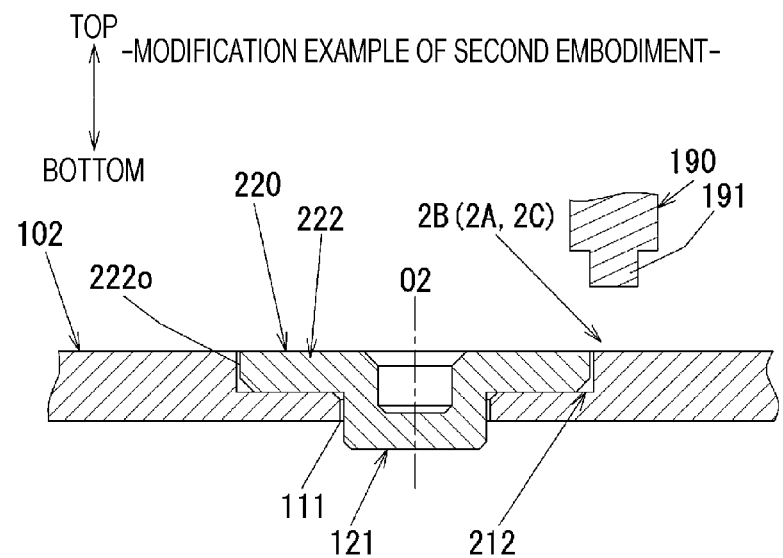
FIG. 17A AND 17B are schematic cross-sectional views describing a sealing method for sealing the liquid injecting hole by using the sealing plug in an electric storage device according to a modification example of the second embodiment.
Figure 17B:
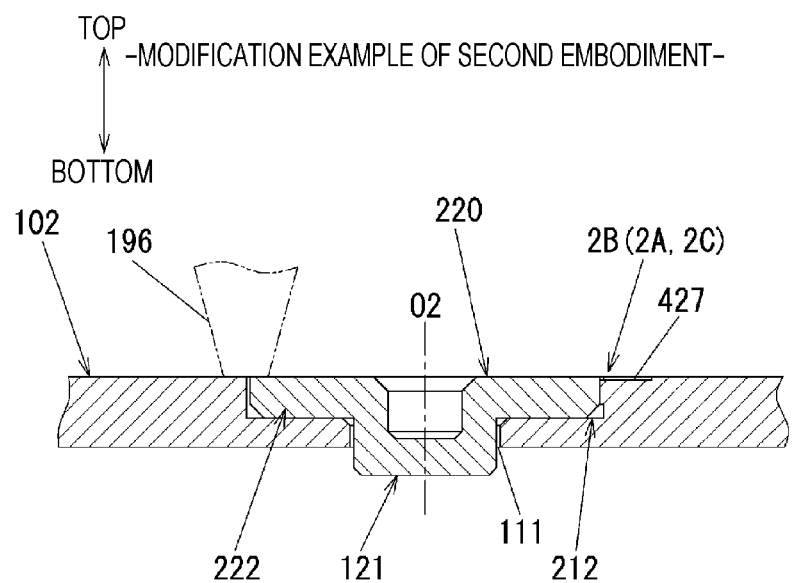

As illustrated in FIGS. 16(a) and 16(b), even in a case in which the projecting portion 122a is omitted in the first embodiment, by forming plastic deformation portions 327 at the respective predetermined positions 1A, 1B, and 1C in the rim portion of the flange portion 122, the sealing plug 120 can be centered and fixed in the liquid injecting portion 110. This prevents the sealing plug 120 from being displaced, prevents the gap c1 between the sealing plug 120 and the liquid injecting portion 110 from being non-uniform, and enables the favorable weld metal to be formed at the time of welding. Similarly, as illustrated in FIGS. 17(a) and 17(b), even in a case in which the projecting portion 212a is omitted in the second embodiment, by forming plastic deformation portions 427 at the respective predetermined positions 2A, 2B, and 2C in the opening rim portion of the recessed portion 212, the sealing plug 220 can be centered and fixed in the liquid injecting portion. This prevents the sealing plug 220 from being displaced, prevents the gap c1 between the sealing plug 220 and the liquid injecting portion from being non-uniform, and enables the favorable weld metal to be formed at the time of welding.

(4) Both the rim portion of the flange portion 122 or 222 and the opening rim portion of the recessed portion 112 or 212 may project to the outward side of the battery container 103 from the battery lid 102.

(5) In each of the aforementioned embodiments, an example in which n=3 in the condition A has been described. However, the present invention is not limited to this as long as n is an integer of at least 3. Meanwhile, in a case in which n is an integer of at least 4, the condition B is inevitably satisfied. For example, as illustrated in FIGS. 18(a) and 18(b), in cases in which n=4 and in which n=6, when the sealing plug 120 or the liquid injecting portion 110 is halved by an arbitrary virtual plane Q1, one or more region (s) out of n equally-divided regions is/are contained in each of halved regions S1 and S2 by the virtual plane Q1.

Figure 18A:
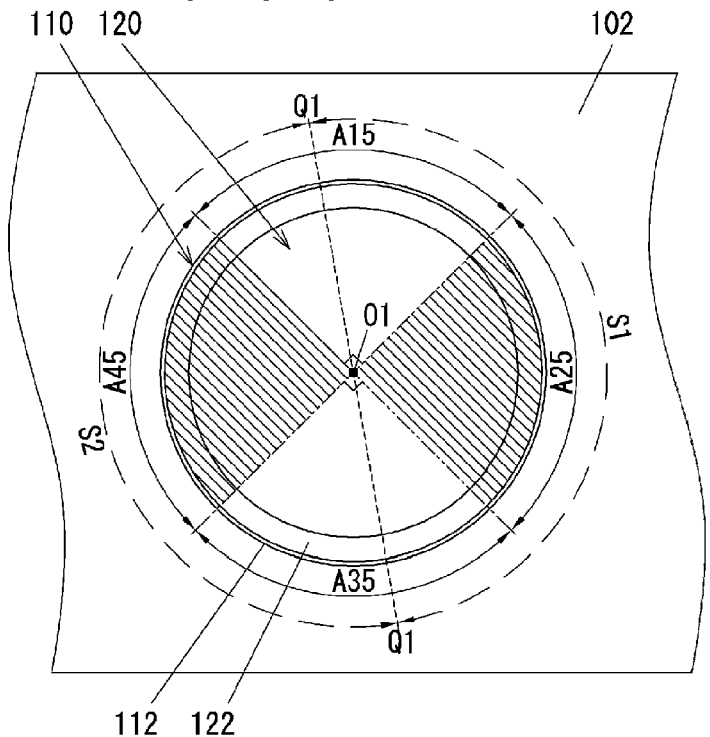
FIG. 18A AND 18B describe that a condition B is inevitably satisfied in a case in which n is an integer of at least 4 in a condition A.
Figure 18B:
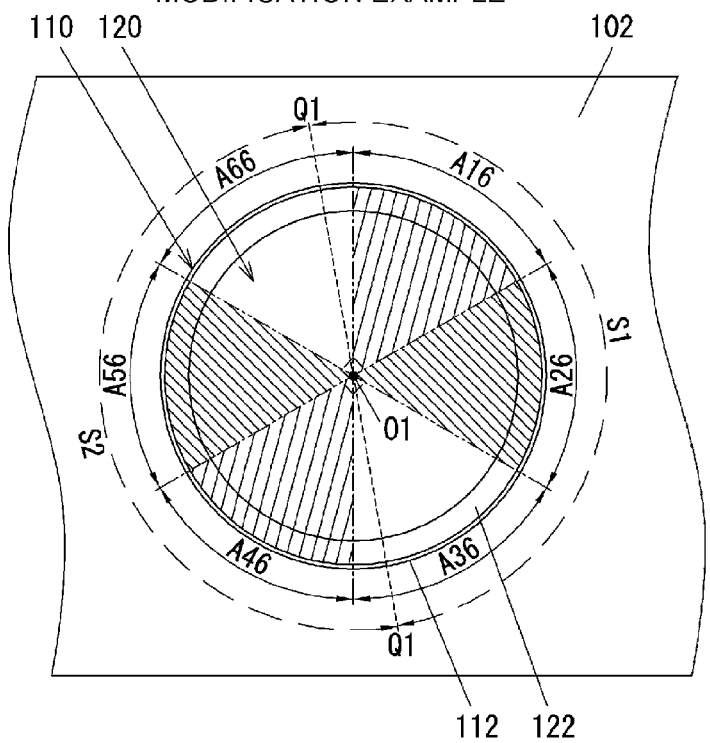

In a case in which n=4, as illustrated in FIG. 18(a), the region S1 contains a whole region A25 while the region S2 contains a whole region A45. In a case in which n=6, as illustrated in FIG. 18(b), the region S1 contains whole regions A16 and A26 while the region S2 contains whole regions A46 and A56. Thus, in the case in which n is an integer of at least 4, the condition B, in which, "in each of regions into which the outer circumference of the flange portion 122 or the inner circumference of the recessed portion 112 is halved with an arbitrary plastic deformation portion 127 set as a starting point, one or more plastic deformation portion(s) 127 other than the plastic deformation portion 127 serving as the starting point is/are arranged," is inevitably satisfied.

Figure 19A:
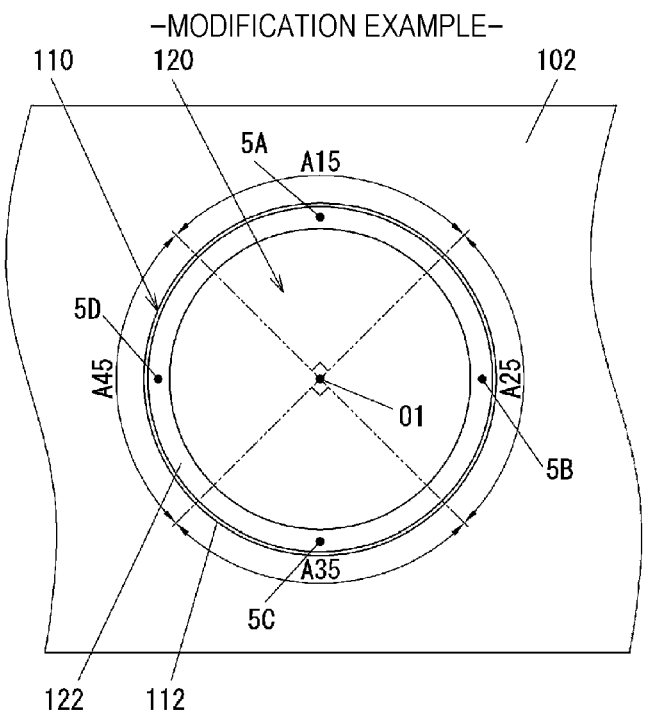
FIGS. 19A and 19B describe an example in which four plastic deformation portions are formed in the flange portion of the sealing plug.
Figure 19B:
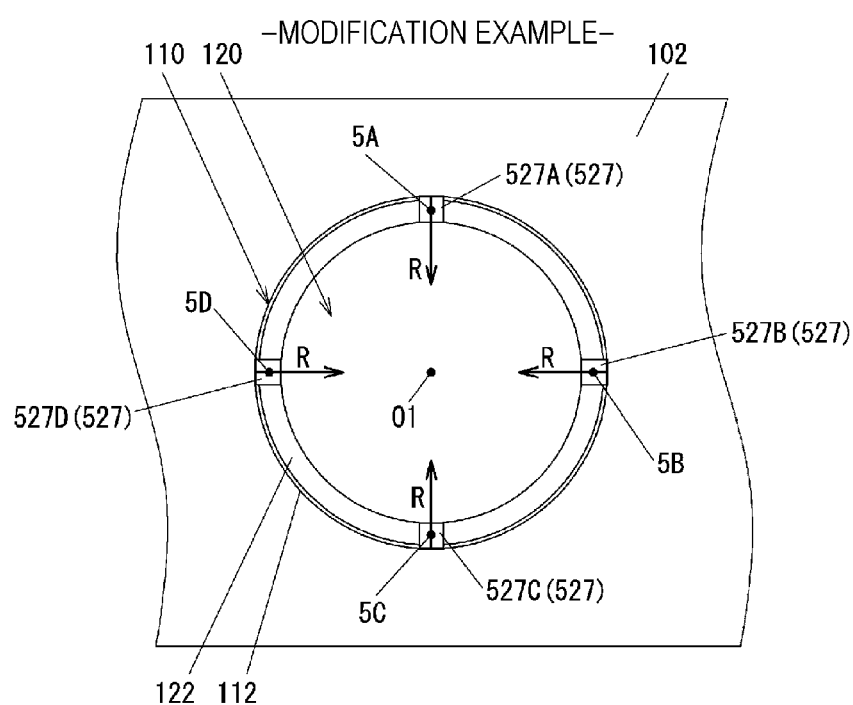

FIGS. 19(a) and 19(b) illustrate an example in which each plastic deformation portion 527 is arranged in each of four regions A15, A25, A35, and A45 into which the outer circumference of the flange portion 122 is equally divided. By doing so, pressing forces toward the center axis O1 from the outward side of the sealing plug 120 can act on the sealing plug 120 at respective predetermined positions 5A, 5B, 5C, and 5D, and the sealing plug 120 can be fixed in the liquid injecting portion 110 while being centered.

As illustrated in FIGS. 19(a) and 19(b), in a case in which the plastic deformation portions 527 are arranged at regular intervals in the circumferential direction, it is preferable (1) to form the plastic deformation portions 527A and 527C at the opposed paired predetermined positions 5A and 5C at the same time and (2) to thereafter form the plastic deformation portions 527B and 527D at the opposed paired predetermined positions 5B and 5D at the same time. By pressing the opposed paired predetermined positions, the sealing plug 120 can be prevented from being displaced at the time of pressing with use of the pressing jigs 190. Also, by setting the number of parts pressed at the same time to two, load acting on the battery lid 102 can be reduced. Meanwhile, a pressing method with use of the pressing jigs 190 is not limited to the case of pressing the paired predetermined positions 5A and 5C and thereafter pressing the paired predetermined positions 5B and 5D. All of the respective predetermined positions 5A, 5B, 5C, and 5D may be pressed at the same time or one by one.

Figure 20A:
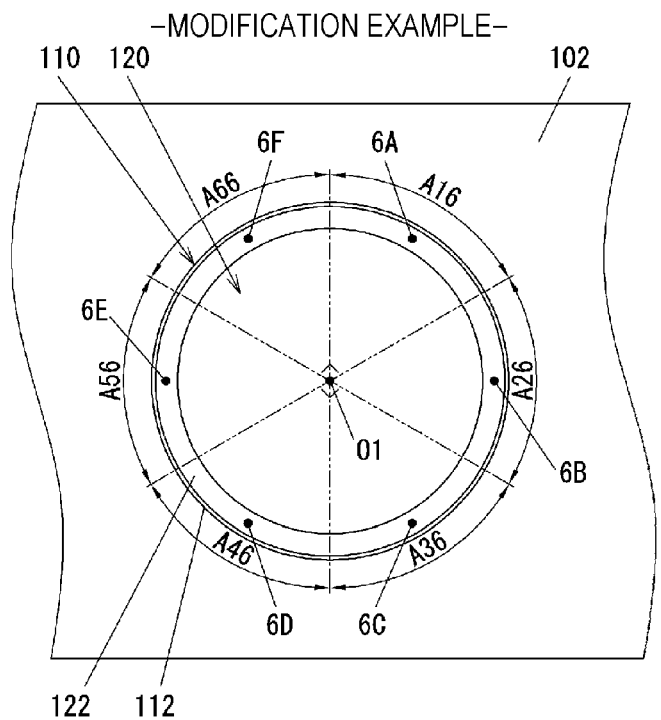
FIGS. 20A and 20B describe an example in which six plastic deformation portions are formed in the flange portion of the sealing plug.
Figure 20B:
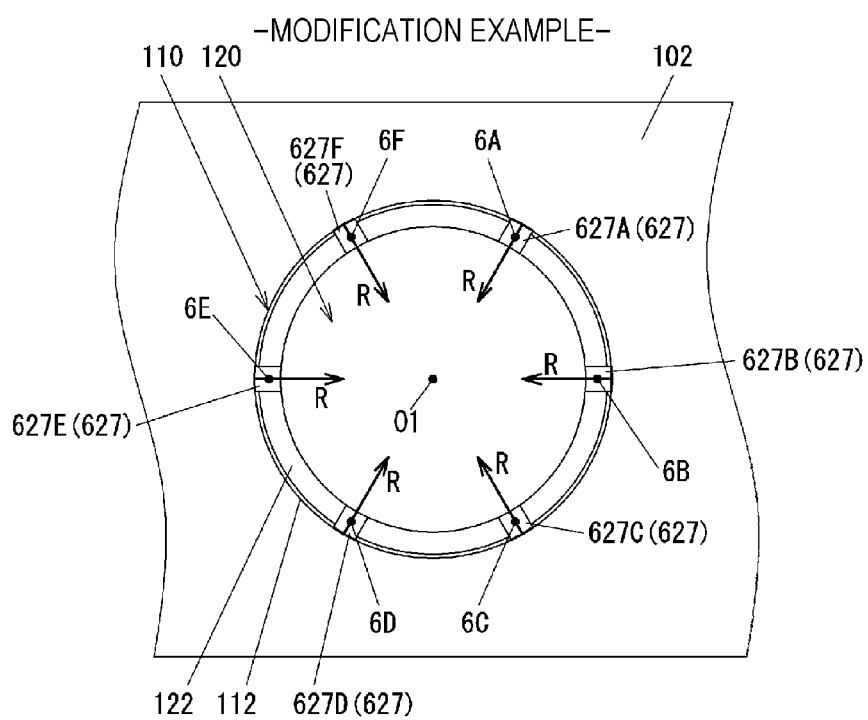

FIGS. 20(a) and 20(b) illustrate an example in which each plastic deformation portion 627 is arranged in each of six regions A16, A26, A36, A46, A56, and A66 into which the outer circumference of the flange portion 122 is equally divided. Pressing forces toward the center axis O1 from the outward side of the sealing plug 120 can act on the sealing plug 120 at respective predetermined positions 6A, 6B, 6C, 6D, 6E, and 6F, and the sealing plug 120 can be fixed in the liquid injecting portion 110 while being centered.

As illustrated in FIGS. 20(a) and 20(b), in a case in which the plastic deformation portions 627 are arranged at regular intervals in the circumferential direction, it is preferable (1) to form the plastic deformation portions 627A and 627D at the opposed paired predetermined positions 6A and 6D at the same time, (2) to thereafter form the plastic deformation portions 627B and 627E at the opposed paired predetermined positions 6B and 6E at the same time, and (3) to thereafter form the plastic deformation portions 627C and 627F at the opposed paired predetermined positions 6C and 6F at the same time. By pressing the opposed paired predetermined positions, the sealing plug 120 can be prevented from being displaced at the time of pressing with use of the pressing jigs 190. Also, by setting the number of parts pressed at the same time to two, load acting on the battery lid 102 can be reduced. Meanwhile, a pressing method with use of the pressing jigs 190 is not limited to the case of pressing the paired predetermined positions 6A and 6D, thereafter pressing the paired predetermined positions 6B and 6E, and thereafter pressing the paired predetermined positions 6C and 6F. For example, by pressing the three predetermined positions 6A, 6C, and 6E at the same time and thereafter pressing the three predetermined positions 6B, 6D, and 6F at the same time, the sealing plug 120 can easily be prevented from being decentered at the time of pressing. Also, all of the respective predetermined positions 6A, 6B, 6C, 6D, 6E, and 6F may be pressed at the same time or one by one.

Figure 21A:
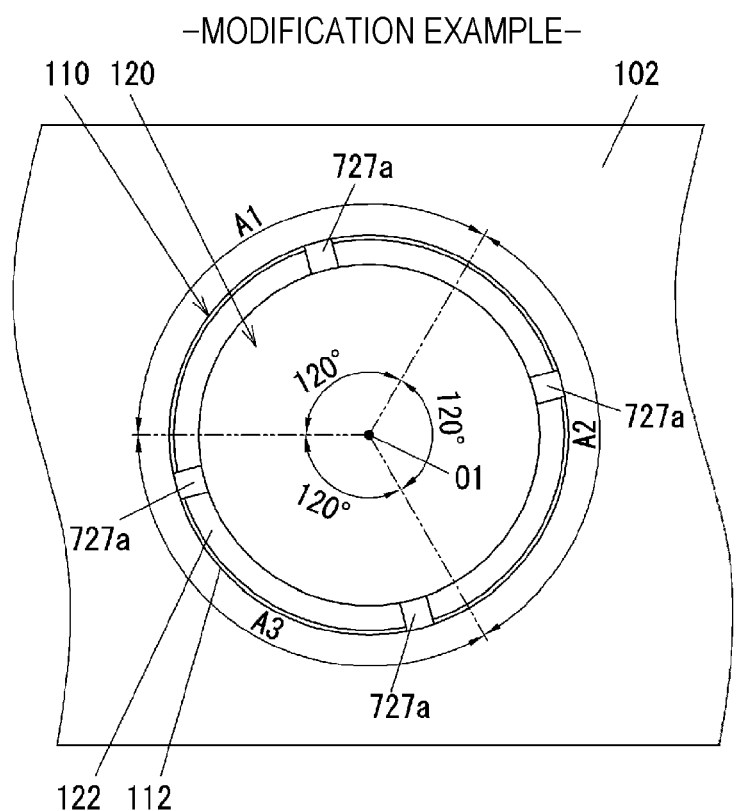
FIGS. 21A and 21B describe an example in which one or more plastic deformation portion(s) is/are formed in each of three equally-divided regions.
Figure 21B:
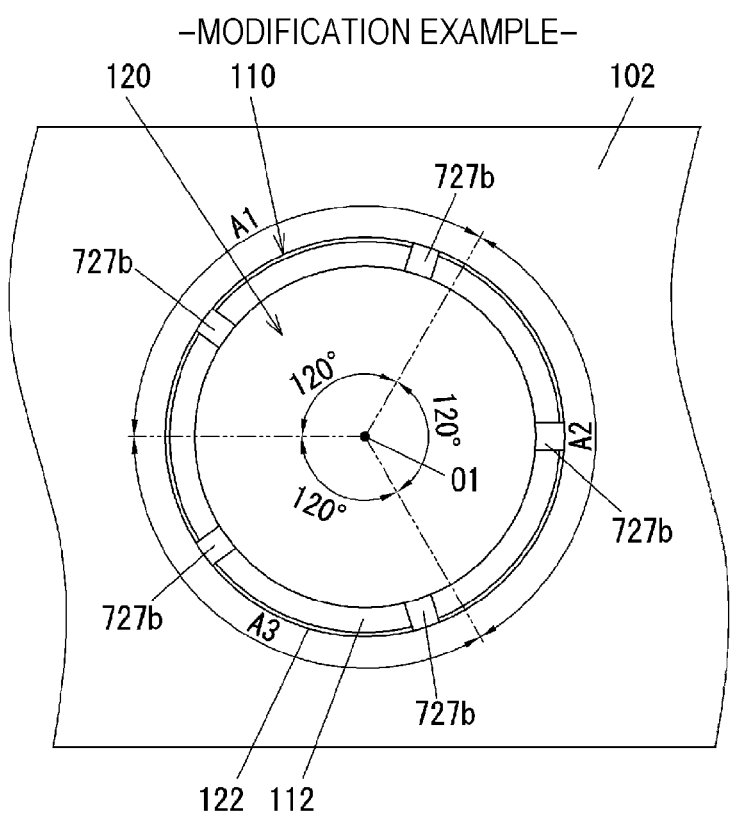

(6) In each of the aforementioned embodiments, an example in which each plastic deformation portion is provided in each of regions into which the outer circumference of the flange portion 122 or 222 or the inner circumference of the recessed portion 112 or 212 is equally divided has been described, and the present invention is not limited to this. One or more plastic deformation portion(s) may be provided in each region. For example, as illustrated in FIG. 21(a), the outer circumference of the flange portion 122 may be equally divided into n regions (n=3), one plastic deformation portion 727a may be provided in each of regions A1 and A2, and two plastic deformation portions 727a may be provided in a region A3. Also, as illustrated in FIG. 21(b), two plastic deformation portions 727b may be provided in each of regions A1 and A3, and one plastic deformation portion 727b may be provided in a region A2. That is, all that the present invention has to be satisfied is that, in each of n regions (n is an integer of at least 3) into which the outer circumference of the flange portion 122 or 222 or the inner circumference of the recessed portion 112 or 212 is equally divided, one or more plastic deformation portion(s) is/are arranged, and that, in each of regions into which the outer circumference of the flange portion 122 or 222 or the inner circumference of the recessed portion 112 or 212 is halved with an arbitrary plastic deformation portion set as a starting point, one or more plastic deformation portion(s) other than the plastic deformation portion serving as the starting point is/are arranged.

Meanwhile, "n" to be set when the outer circumference of the flange portion 122 or 222 or the inner circumference of the recessed portion 112 or 212 is divided into n equal parts is set in consideration of the length of the plastic deformation portion in the circumferential direction, the number of the plastic deformation portions, the shapes of the flange portion 122 or 222 and the recessed portion 112 or 212, the length of the circumference, and the like so that the plastic deformation portions can be formed to be spaced from each other in the circumferential direction.

Figure 22A:
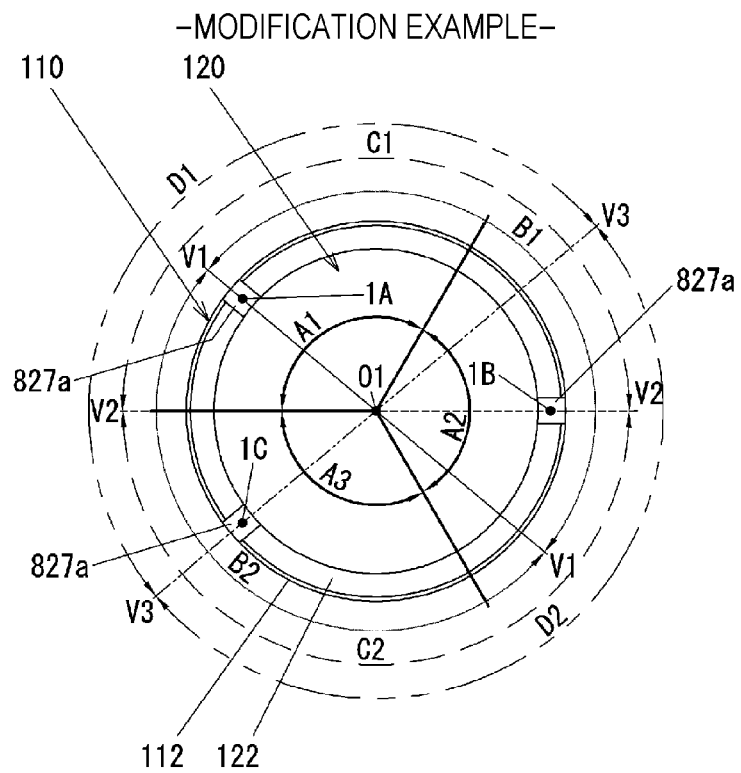
FIGS. 22A and 22B describe an example in which the plastic deformation portions are formed at irregular intervals in a circumferential direction.
Figure 22B:
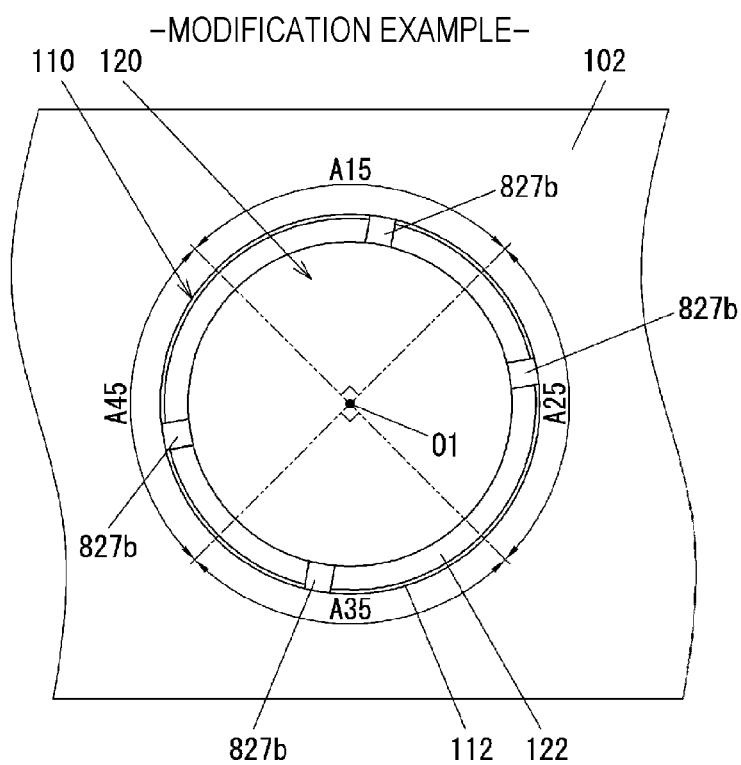

(7) In each of the aforementioned embodiments, an example in which the plastic deformation portions 127 or 227 are formed at regular intervals along the circumference of the flange portion 122 or 222 of the sealing plug 120 or 220 or the circumference of the recessed portion 112 or 212 has been described, and the present invention is not limited to this. A case in which plastic deformation portions 827a or 827b are formed at irregular intervals in the circumferential direction as illustrated in FIG. 22(a) or 22(b) may be available as long as the aforementioned conditions A and B are satisfied.

(8) The width and the depth of the weld metal W to be formed over the entire circumference of the sealing plug 120 or 220 are not limited to those in the aforementioned embodiments. In FIGS. 7(b) and 9(b), the weld metal W is formed so that the width (length in the radial direction) of the weld metal W may be longer than the length of the plastic deformation portion 127 in the radial direction and the width (length in the radial direction) of the projecting portion 122a, and the present invention is not limited to this. The weld metal W may be formed so that the width (length in the radial direction) of the weld metal W may be shorter than the length of the plastic deformation portion 127 in the radial direction and the width (length in the radial direction) of the projecting portion 122a.

(9) Description has been provided, taking the lithium ion secondary battery as an example of the electric storage device, and the present invention is not limited to this. The present invention can be applied to various electric storage devices such as another secondary battery such as a nickel-metal-hydride battery, a lithium ion capacitor, and an electric double-layer capacitor. Also, the shape of the container is not limited to the rectangular shape.

(10) The welding conditions are not limited to the aforementioned ones. Also, the sealing plug 120 or 220 may be welded to the battery lid 102 by means of electron beam welding instead of laser beam welding.

The various embodiments and modification examples have been described above, and the present invention is not limited to these. Other aspects that can be arrived within the scope of the technical idea of the present invention are included in the scope of the present invention.

REFERENCE SIGNS LIST 100 rectangular secondary battery, 101 battery can, 101a wide surface, 101b narrow surface, 101c bottom surface, 101d opening portion, 102 battery lid, 102h through hole, 103 battery container, 104 gas exhaust valve, 107 battery lid assembly, 108 insulating case, 110 liquid injecting portion, 111 liquid injecting hole, 111i inner circumferential side surface, 112 recessed portion, 112b bottom surface, 112i inner circumferential side surface, 120 sealing plug, 121 cylindrical portion, 121a bottom portion, 121o outer circumferential side surface, 122 flange portion, 122a projecting portion, 122o outer circumferential side surface, 125 hollow portion, 127 (127A, 127B, 127C) plastic deformation portion, 127o outer circumferential side surface, 141 positive-electrode terminal, 150 gasket, 151 negative-electrode terminal, 160 insulating member, 170 electric generating element, 171 positive-electrode foil, 172 negative-electrode foil, 173 separator, 174 positive electrode, 175 negative electrode, 176 positive-electrode active material combined agent layer, 177 negative-electrode active material combined agent layer, 181 positive-electrode current collector, 182 negative-electrode current collector, 190 pressing jig, 191 pressing portion, 196 laser beam, 212 recessed portion, 212a projecting portion, 220 sealing plug, 222 flange portion, 222o outer circumferential side surface, 227 (227A, 227B, 227C) plastic deformation portion, 227i inside surface, 327 plastic deformation portion, 427 plastic deformation portion, 527 (527A, 527B, 527C, 527D) plastic deformation portion, 627 (627A, 627B, 627C, 627D, 627E, 627F) plastic deformation portion, 727a, 727b plastic deformation portion, 827a, 827b plastic deformation portion, 927A, 927B, 927C plastic deformation portion

The invention claimed is:

1. An electric storage device, comprising:
a container which houses an electric generating element; and
a sealing plug which seals a liquid injecting hole into which an electrolyte is injected,
wherein the liquid injecting hole is provided in a bottom surface of a recessed portion provided to be recessed on one side surface of the container,
the sealing plug includes an inserting portion to be inserted into the liquid injecting hole and a fitting portion to be fitted into the recessed portion,
at least either a rim portion of the fitting portion or an opening rim portion of the recessed portion is provided with a plurality of plastic deformation portions,
in each of n regions (n is an integer of at least 3) into which an outer circumference of the fitting portion or an inner circumference of the recessed portion is equally divided, one or more of the plastic deformation portion(s) is/are arranged, and, in each of regions into which the outer circumference of the fitting portion or the inner circumference of the recessed portion is halved with an arbitrary plastic deformation portion out of the plastic deformation portions set as a starting point, one or more of the plastic deformation portion(s) is/are arranged, and
an outer circumferential side surface of the fitting portion and an inner circumferential side surface of the recessed portion are welded over an entire circumference.

2. The electric storage device according to claim 1, wherein at least either the rim portion of the fitting portion or the opening rim portion of the recessed portion projects to an outward side of the container from the one side surface of the container.

3. A method for manufacturing an electric storage device for housing an electric generating element in a container, injecting an electrolyte into the container via a liquid injecting hole provided in a bottom surface of a recessed portion provided to be recessed on one side surface of the container, and sealing the liquid injecting hole by using a sealing plug, the method comprising:
when the liquid injecting hole is sealed by the sealing plug,
arranging the sealing plug in the liquid injecting hole by inserting an inserting portion provided in the sealing plug into the liquid injecting hole and fitting a fitting portion provided in the sealing plug into the recessed portion;
temporarily attaching the sealing plug to the liquid injecting hole by pressing a plurality of predetermined positions in at least either a rim portion of the fitting portion or an opening rim portion of the recessed portion from an outward side of the container to form plastic deformation portions; and
welding an outer circumferential side surface of the fitting portion and an inner circumferential side surface of the recessed portion over an entire circumference,
wherein, in each of n regions (n is an integer of at least 3) into which an outer circumference of the fitting portion or an inner circumference of the recessed portion is equally divided, one or more of the plastic deformation portion(s) is/are arranged, and, in each of regions into which the outer circumference of the fitting portion or the inner circumference of the recessed portion is halved with an arbitrary plastic deformation portion out of the plastic deformation portions set as a starting point, one or more of the plastic deformation portion(s) is/are arranged.

4. The method for manufacturing an electric storage device according to claim 3, wherein at least either the rim portion of the fitting portion or the opening rim portion of the recessed portion is a projecting portion which projects to the outward side of the container from the one side surface of the container, and
wherein the plastic deformation portions are formed by pressing the projecting portion at the plurality of predetermined positions.

* * * * *